(12) United States Patent
Tian et al.

(10) Patent No.: US 10,620,979 B2
(45) Date of Patent: Apr. 14, 2020

(54) TECHNIQUES FOR CHECKPOINTING/DELIVERY BETWEEN PRIMARY AND SECONDARY VIRTUAL MACHINES

(71) Applicant: INTEL CORPORATION, Santa Clara, CA (US)

(72) Inventors: Kun Tian, Shanghai (CN); Yao Zu Dong, Shanghai (CN)

(73) Assignee: INTEL CORPORATION, Santa Clara, CA (US)

(*) Notice: Subject to any disclaimer, the term of this patent is extended or adjusted under 35 U.S.C. 154(b) by 0 days.

(21) Appl. No.: 15/516,381

(22) PCT Filed: Oct. 8, 2014

(86) PCT No.: PCT/CN2014/088132
§ 371 (c)(1),
(2) Date: Mar. 31, 2017

(87) PCT Pub. No.: WO2016/054770
PCT Pub. Date: Apr. 14, 2016

(65) Prior Publication Data
US 2017/0300347 A1  Oct. 19, 2017

(51) Int. Cl.
*G06F 9/44* (2018.01)
*G06F 9/455* (2018.01)
*G06F 11/14* (2006.01)

(52) U.S. Cl.
CPC .......... *G06F 9/455* (2013.01); *G06F 9/45558* (2013.01); *G06F 11/1446* (2013.01); *G06F 11/1461* (2013.01); *G06F 2009/4557* (2013.01); *G06F 2009/45595* (2013.01); *G06F 2201/84* (2013.01)

(58) Field of Classification Search
None
See application file for complete search history.

(56) References Cited

U.S. PATENT DOCUMENTS

| 8,806,266 B1 | 8/2014 | Qu et al. |
| 2008/0201414 A1* | 8/2008 | Amir Husain .......... G06F 9/445 709/203 |
| 2010/0005465 A1* | 1/2010 | Kawato .................... G06F 9/455 718/1 |

(Continued)

FOREIGN PATENT DOCUMENTS

| JP | 20100160660 A | 7/2010 |
| WO | WO-2013101032 A1 * | 7/2013 |

OTHER PUBLICATIONS

Dong et al., COLO: COarse-grained LOck-stepping Virtual Machines for Non-stop Service, SoCC'13, Oct. 1-3, 2013, ACM.*

(Continued)

*Primary Examiner* — Insun Kang

(57) ABSTRACT

Examples may include a determining a checkpointing/delivery policy for primary and secondary virtual machines based on output-packet-similarities. The output-packet-similarities may be based on a comparison of time intervals via which content matched for packets outputted from the primary and secondary virtual machines. A checkpointing/delivery mode may then be selected based, at least in part, on the determined checkpointing/delivery policy.

22 Claims, 18 Drawing Sheets

(56) References Cited

U.S. PATENT DOCUMENTS

| | | | |
|---|---|---|---|
| 2010/0318991 A1* | 12/2010 | Venkitachalam | G06F 9/45533 718/1 |
| 2011/0208908 A1 | 8/2011 | Chou et al. | |
| 2011/0225455 A1* | 9/2011 | Eguchi | G06F 11/142 714/15 |
| 2011/0289345 A1 | 11/2011 | Agesen et al. | |
| 2012/0084782 A1* | 4/2012 | Chou | G06F 11/1484 718/102 |
| 2013/0024855 A1 | 1/2013 | North | |
| 2013/0042150 A1 | 2/2013 | McNeeney | |
| 2014/0157270 A1* | 6/2014 | DeLuca | G06F 9/45558 718/1 |
| 2014/0244719 A1* | 8/2014 | Clark | H04L 29/0604 709/203 |
| 2014/0380275 A1* | 12/2014 | Trofin | G06F 8/72 717/120 |
| 2015/0205673 A1* | 7/2015 | Bissett | G06F 9/45533 714/16 |
| 2015/0378761 A1* | 12/2015 | Sevigny | G06F 9/45558 718/1 |
| 2015/0378853 A1* | 12/2015 | Sevigny | G06F 11/2023 714/4.11 |
| 2016/0077857 A1* | 3/2016 | Dong | G06F 9/466 718/1 |
| 2016/0248883 A1* | 8/2016 | Xu | H04L 49/70 |
| 2017/0213028 A1* | 7/2017 | Chen | G06F 21/556 |
| 2018/0129542 A1* | 5/2018 | Jahagirdar | G06F 9/4856 |

OTHER PUBLICATIONS

International Search Report, dated May 27, 2015, Application No. PCT/CN2014/088132, filed Date: Oct. 8, 2014, pp. 3.

European Search Report for the European Patent Application No. 14903675, dated May 16, 2018, 2 pages.

* cited by examiner

Database 300

| Checkpoint # | Time Interval |
|---|---|
| 1 | 1s |
| 2 | 2s |
| 3 | 25ms |
| m | 40ms |

*FIG. 3*

Database 700

CCA Information 710

| Checkpoint # | Time Interval | TCP Connection Associated with Checkpoint |
|---|---|---|
| 1 | 50ms | 5 |
| 2 | 45ms | 102 |
| 3 | 10ms | 1 |
| m | 15ms | 1 |

Agent Information 720

| Application | TCP Connection(s)/Port(s) |
|---|---|
| A6 | 5 |
| A7 | 102 |
| A8 | 1 |

RECEIVE, AT A PROCESSOR CIRCUIT, INFORMATION INDICATING OUTPUT-PACKET-SIMILARITY BETWEEN A PVM HOSTED BY A FIRST SERVER AND AN SVM HOSTED BY A SECOND SERVER, THE OUTPUT-PACKET-SIMILARITY INCLUDING SEPARATE TIME INTERVALS DURING WHICH CONTENT MATCHED FOR OUTPUT PACKETS FROM THE PVM AND THE SVM
*1002*

DETERMINE A CP/D POLICY FOR OUTPUTTED PACKETS BASED ON THE INFORMATION
*1004*

SENDING THE CP/D POLICY TO A COLO MANAGER FOR THE COLO MANAGER TO SELECT A CP/D MODE BASED, AT LEAST IN PART, ON THE CP/D POLICY
*1006*

FIG. 10

Storage Medium 1100

*Computer Executable Instructions for 1000*

COMPARE, AT A PROCESSOR CIRCUIT, OUTPUT PACKET CONTENTS GENERATED FROM A PVM HOSTED BY A FIRST SERVER WITH OUTPUT PACKET CONTENTS FROM AN SVM HOSTED BY A SECOND SERVER
1302

DETERMINE ONE OR MORE TIME INTERVALS VIA WHICH THE OUTPUT PACKET CONTENTS MATCH
1304

UPDATE INFORMATION INDICATING OUTPUT-PACKET-SIMILARITY BETWEEN THE PVM AND THE SVM BASED ON THE ONE OR MORE TIME INTERVALS
1306

SEND THE UPDATED INFORMATION TO A CCA FOR THE CCA TO DETERMINE A CP/D POLICY FOR OUTPUTTED PACKETS FROM THE PVM AND THE SVM
1308

RECEIVE THE DETERMINED CP/D POLICY FROM THE CCA
1310

SELECT A CP/D MODE BASED, AT LEAST IN PART, ON THE CP/D POLICY
1312

*FIG. 13*

Storage Medium 1400

*Computer Executable Instructions for 1300*

RECEIVE, AT A PROCESSOR CIRCUIT, INFORMATION TO INDICATE OUTPUT-PACKET-SIMILARITY FOR ONE OR MORE APPLICATIONS SEPARATELY EXECUTED BY A PVM HOSTED BY A FIRST SERVER AND AN SVM HOSTED BY A SECOND SERVER, THE OUTPUT-PACKET-SIMILARITY INCLUDING SEPARATE TIME INTERVALS DURING WHICH CONTENT MATCHED FOR OUTPUT PACKETS SEPARATELY GENERATED BY THE ONE OR MORE APPLICATIONS SEPARATELY EXECUTED BY THE PVM AND THE SVM
*1602*

ADD THE PVM AND THE SVM TO ONE OF AN INSTANT POOL OR A BUFFERED POOL BASED ON A CP/D MODE USED BY A COLO MANAGER AT THE FIRST SERVER OR THE SECOND SERVER TO ROUTE OUTPUT PACKETS FROM THE PVM OR THE SVM TO AN EXTERNAL NETWORK, THE INSTANT POOL INCLUDING ONE OR MORE FIRST PVMS/SVMS ARRANGED TO HAVE OUTPUTTED PACKETS FROM THE ONE OR MORE FIRST PVMS/SVMS IMMEDIATELY ROUTED TO THE EXTERNAL NETWORK AS LONG AS CONTENT FOR OUTPUTTED PACKETS MATCH BETWEEN THE FIRST PVMS/SVMS, THE BUFFERED POOL INCLUDING ONE OR MORE SECOND PVMS/SVMS ARRANGED TO HAVE OUTPUTTED PACKETS FROM ONE OR MORE SECOND PVMS/SVMS DELAYED FROM BEING ROUTED TO THE EXTERNAL NETWORK, THE OUTPUTTED PACKETS DELAYED UNTIL PERIODIC CHECKPOINT ACTIONS ARE COMPLETED BY RESPECTIVE SECOND PVMS/SVMS
*1604*

*FIG. 16*

Storage Medium 1700

*Computer Executable Instructions for 1600*

*FIG. 17*

TECHNIQUES FOR CHECKPOINTING/DELIVERY BETWEEN PRIMARY AND SECONDARY VIRTUAL MACHINES

CROSS-REFERENCE TO RELATED APPLICATIONS

This application is a national stage application claiming the benefit of and priority to International Application No. PCT/CN14/088132 entitled "TECHNIQUES FOR CHECKPOINTING/DELIVERY BETWEEN PRIMARY AND SECONDARY VIRTUAL MACHINES" filed Oct. 8, 2014, which is hereby incorporated by reference in its entirety.

TECHNICAL FIELD

Examples described herein are generally related to replicating virtual machines (VMs) executing one or more applications having output packets routed to a network.

BACKGROUND

Network servers coupled with client computing devices are increasingly being arranged to support or host virtual machine(s) (VMs) that enable multiple operating systems and/or applications to be supported by a single computing platform. Also, when high availability is desired for servers hosting VMs, a primary VM (PVM) and a secondary VM (SVM) may each be hosted on separate servers or nodes (e.g., within a data center) and their states may be replicated. This replication of states may provide for an application-agnostic, software-implemented hardware fault tolerance solution for "non-stop-service". The fault tolerance solution may allow for the SVM to take over (failover) when the server hosting the PVM suffers a hardware failure.

Lock-stepping is a fault tolerance solution that may replicate VM states per instruction. For example, PVM and SVM execute in parallel for deterministic instructions, but lock-step for non-deterministic instructions. However, lock-stepping may suffer from very large overhead when dealing with multiprocessor (MP) implementations, where each memory access might be non-deterministic.

Checkpointing is another fault tolerance solution that replicates a PVM state to the SVM at periodic epochs. For checkpointing, in order to guarantee a successful failover, all output packets may need to be buffered until a successful checkpoint has been completed. Always buffering until a successful checkpoint in a VM environment may lead to extra network latency due to output packet buffering and extra overhead due to frequent checkpoints sometimes referred to as passive checkpointing or periodic checkpointing.

COarse-grain LOck-stepping (COLO) is yet another fault tolerance solution that has both PVM and SVM being fed with the same request/data (input) network packets from a client. Logic supporting COLO may be capable of monitoring output responses of the PVM and SVM and consider the SVM's state as a valid replica of the PVM's state, as long as network responses (output) generated by the SVM match that of the PVM. If a given network response does not match, transmission of the network response to the client is withheld until the PVM state has been synchronized (force a new checkpoint) to the SVM state. Hence, COLO may ensure that a fault tolerant system is highly available via failover to the SVM. This high availability may exist even though non-determinism may mean that the SVM's internal state is different to that of the PVM, the SVM is equally valid and remains consistent from the point of view of external observers to the fault tolerant system that implements COLO. Thus, COLO may have advantages over pure lock-stepping or checkpointing fault tolerance solutions, by both avoiding complexity of handling MP non-deterministic in lock-stepping and reducing the checkpointing frequency/overhead in passive checkpointing. COLO may be referred to active checkpointing or on-demand checkpointing.

COLO fault tolerance solutions may take advantage of such protocols as those associated with the transport control protocol (TCP) stack. The TCP stack may be arranged to have a state per connection and may be capable of recovering from packet loss and/or packet re-ordering. COLO may include use of a per-TCP connection response packet comparison. The per-TCP connection response packet comparison may consider an SVM state as a valid replica if response packets of each TCP connection outputted from the PVM match response packets of each TCP connection outputted from the SVM. This matching is regardless of possible packet ordering across TCP connections.

BRIEF DESCRIPTION OF THE DRAWINGS

FIG. 3 illustrates an example first database.
FIG. 7 illustrates an example second database.
FIG. 10 illustrates an example of a first logic flow.
FIG. 11 illustrates an example of a first storage medium.
FIG. 13 illustrates an example of a second logic flow.
FIG. 14 illustrates an example of a second storage medium.
FIG. 16 illustrates an example of a third logic flow.
FIG. 17 illustrates an example of a third storage medium.

DETAILED DESCRIPTION

As contemplated in the present disclosure, COLO may have advantages over pure lock-stepping or checkpointing fault tolerance solutions. COLO may greatly improve performance of a highly available fault tolerant system via use of servers that host a PVM and an SVM. However, performance of COLO depends on output similarity of each TCP connection. For example, the number of identical output packets per-TCP connection the PVM and SVM may generate or a duration the PVM and SVM may generate matching output packets for all TCP connections.

Also, a single PVM may open or maintain numerous TCP connections according to various TCP/internet protocol (IP) stack implementations. Further, TCP/IP stack implementations may not be deterministic. It is with respect to these challenges that the examples described herein are needed.

According to some first examples, techniques for checkpointing/delivery (CP/D) between PVMs and SVMs may include receiving information indicating output-packetsimilarity between a PVM hosted by a first server and an SVM hosted by a second server. For these examples, the output-packet-similarity may include separate time intervals via which content matched for output packets from the PVM and the SVM. The first examples may also include determining a CP/D policy for outputted packets based on the information and the sending the CP/D policy to a COLO manager. The COLO manager may then select a CP/D mode based, at least in part, on the CP/D policy.

In some second examples, techniques for CP/D between PVMs and SVMs may include comparing output packet contents from a PVM hosted by a first server with output packet contents from an SVM hosted by a second server. The second examples may also include determining one or more time intervals via which the output packet contents match and the updating information indicating output-packet-similarity between the PVM and the SVM based on the one or more time intervals. The second examples may also include sending the updated information to a COLO checkpointing arbitrator (CCA). The CCA, responsive to receiving the updated information, may determine a CP/D policy for outputted packets from the PVM and the SVM. The determined CP/D policy may then be received from the CCA and a CP/D mode may be selected based, at least in part, on the CP/D policy.

Figure 1:
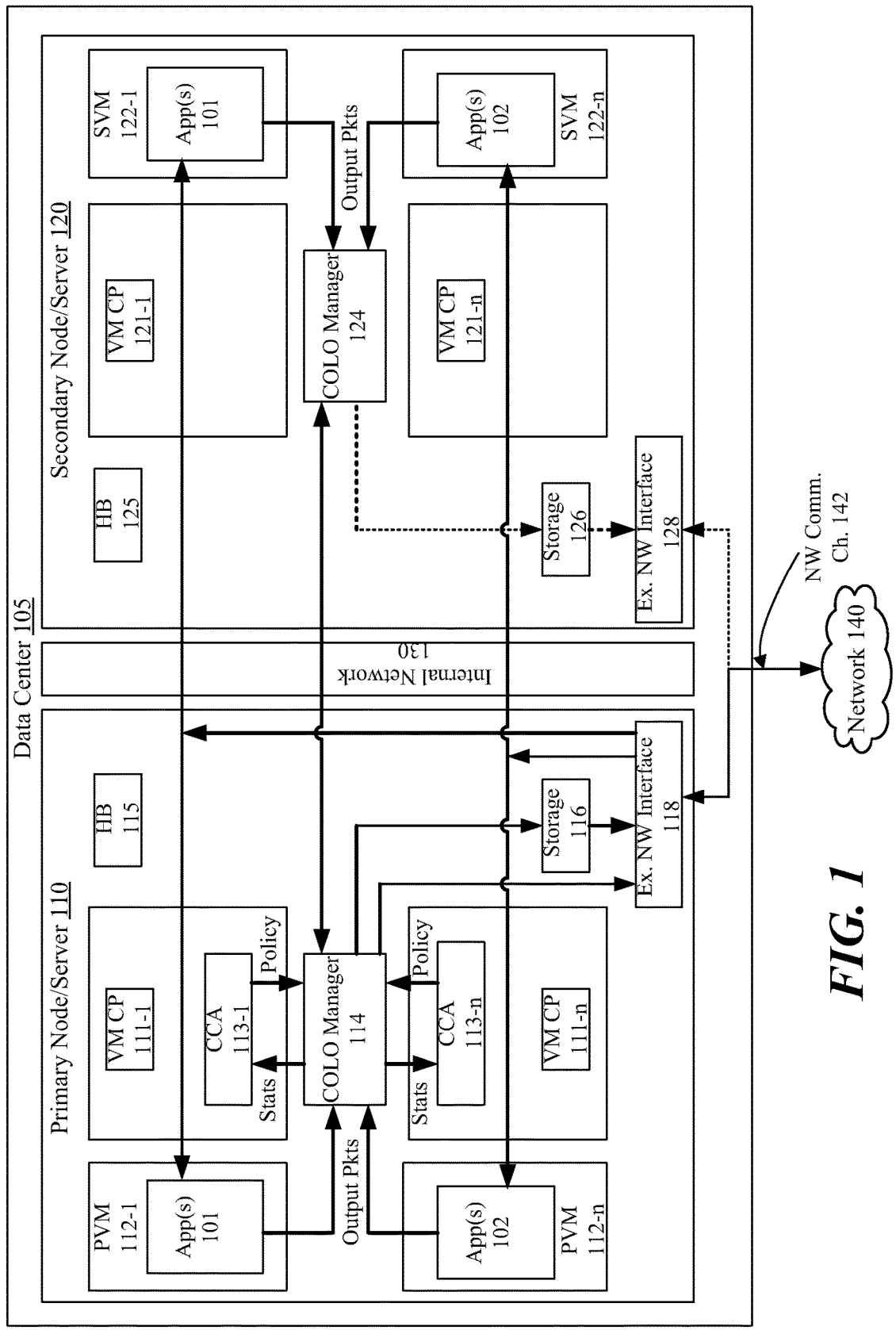
FIG. 1 illustrates an example first system.

FIG. 1 illustrates an example first system. In some examples, as shown in FIG. 1, the first example system includes system 100. System 100 includes a data center 105 having a primary node/server 110 coupled with a secondary node/server 120 via an internal network 130. Also, as shown in FIG. 1, primary node 110 or secondary node 120 may be coupled with an external network 140 via a network (NW) communication channel 142.

According to some examples, primary node/sever 110 and secondary node/server 120 may be arranged as part of a fault tolerance system. For these examples, primary node/server 110 may be arranged to host a multitude of PVMs 112-1 to 112-n, where "n" represents any positive whole integer greater than 1. Also, secondary node/server 120 may be arranged to host a multitude of corresponding SVMs 122-1 to 122-n.

In some examples, PVM 112-1 and SVM 122-1 may be capable of separately executing the same application(s) 101, while PVM 112-n and SVM 122-n may be capable of separately executing the same application(s) 102. For these examples, PVM 112-1/SVM 122-1 running application(s) 101 and PVM 112-n/SVM 122-n running application(s) 102 may each utilize one or more TCP connections to route outputted packets to an external network such as network 140.

According to some examples, primary node/server 110 and secondary node/server 120 may each maintain respective heartbeats 115 and 125 to communicate health status for the overall server (e.g., physical hardware). For example, heartbeat 115 may relay health status information for primary node/server 110 to enable secondary node 120 to determine if primary node/server 110 has failed or become unresponsive and thus requiring SVM 122-1 or SVM 122-n to failover and become the PVM to serve or handle requests from clients coupled to network 140 (not shown). Similarly, heartbeat 125 may relay health status information for secondary node/server 120 to enable primary node/server 110 to determine if secondary node/server 120 has failed or become unresponsive and thus requiring another SVM to be configured for providing fault tolerance for PVM 112-1 or PVM 112-n.

According to some examples, PVM 112-1 and SVM 122-1 may operate within the same internal network domain for processing requests received from a client coupled to data center 105 via network 140. For these examples, requests may be received over NW communication channel 142 through external NW interface 118 at primary node/server 110. The requests may than be routed simultaneously to both PVM 112-1 and SVM 122-1.

In some examples, a COLO manager 114 at primary node 110 and a COLO manager 124 at secondary node 120 may monitor outputs/responses from PVM 112-1 and SVM 122-1. For these examples, output packet contents may be compared by COLO manager 114 or COLO manager 124 to determine one or more time intervals via which the output packet contents match. These time intervals, as described more below, may be used to update information indicating output-packet-similarity between PVM 112-1 and SVM 122-1. The updated information indicating the output-packet-similarity may be sent as statistical information (stats) to a COLO checkpointing arbitrator (CCA) 113-1. Also, as described in more detail below, a CCA such as CCA 113-1 may determine a CP/D policy for outputted packets from PVM 112-1 and SVM 122-1 based on the updated information received from a COLO manager such as COLO manager 114. CCA 113-1 may then send the determined CP/D policy to COLO manager 114. COLO manager 114 may then select a CP/D mode, based, at least in part, on the CP/D policy. COLO manager 114 may then notify COLO manager 124 of the CP/D mode change, so that COLO manager 124 may control or manage output packets from SVM 122-1 using a same CP/D mode.

According to some examples, a selected CP/D mode may include, but is not limited to, an on-demand checkpointing/instant delivery ("instant") mode or a periodic checkpointing/buffered delivery ("buffered") mode. For an instant mode, outputted packets from a VM may be immediately routed to external (Ex.) network (NW) interface 118, while the output packets from SVM are dropped directly as long as content for the outputted packets matches between PVM 112-1 and SVM 122-1. For these examples, if no match, a checkpoint action is implemented (e.g., VM checkpoints (CPs) 111-1 and 121-1) to cause SVM 122-1 to become synchronized with PVM 112-1. During this checkpoint action, delivery of subsequent outputted packets may be delayed (e.g., temporarily stored at storage 116 and 126 and/or at system memory (not shown)) until the checkpoint action is complete. As described more below, an instant mode may be used where a higher level of output-packet-similarity is indicated by the determined time intervals via which the output packet contents matched before a mismatch caused a checkpoint action (e.g., time intervals having an average greater than 40 milliseconds (ms)).

In some examples, for a buffered mode, outputted packets generated by a VM may be buffered and delayed from being routed through to Ex. NW interface 118 to network 140. For these examples, the outputted packets may be delayed until a periodic checkpoint action is completed. The periodic checkpoint action associated with the buffered mode may be based on a fixed time interval or may be based on a dynamic time interval, e.g., determined by CCA 113-1 based, at least in part, on stats received from COLO manager 114.

According to some examples, COLO managers 114 and 124 may monitor output packet contents for a multitude of PVM/SVM combinations. COLO manager 114 may then send information to respective CCAs that may set respective CP/D policies based, at least in part, on the information received from COLO manager 114 (e.g., output-packetsimilarity). Those respective CP/D policies may then be used by COLO manager 114 to select respective CP/D modes.

In some examples, as described in more detail below, a COLO pool manager (CPM) for at least a portion of data center 105 (not shown) may organize PVMs/SVMs into pools of VMs based on which CP/D mode is selected. Also as described more below, an instant pool may include those PVMs/SVMs hosting or executing applications benefiting more from an instant mode. Meanwhile, a buffered pool may include those PVMs/SVMs executing applications benefiting more from a buffered mode. The CPM may maintain a database to monitor PVMs/SVMs included in these two pools and may assess whether one or more applications executed at a given PVM/SVM may be migrated between VMs to improve output-packet-similarity. Also, the CPM manager may coordinate with other CPM managers (not shown) located with data center 105 for possible migration of applications between VMs.

FIG. 1 depicts a type of hybrid virtual machine manager (VMM) model where a privilege guest operating system may be used to run a native device driver and manage other guests. In other examples, types of VMM models such as hypervisor model, where the VMM itself behaviors like an OS and runs the native drivers, or a host-based model, where the VMM is an module of the host OS, may be implemented at a data center similar to data center 105. Examples are not limited exclusively to a hybrid VMM mode, hypervisor VMM model or a host-OS based VMM model. Examples for CP/D between PVM and SVMs may apply equally to both types of VMM models.

Figure 2:
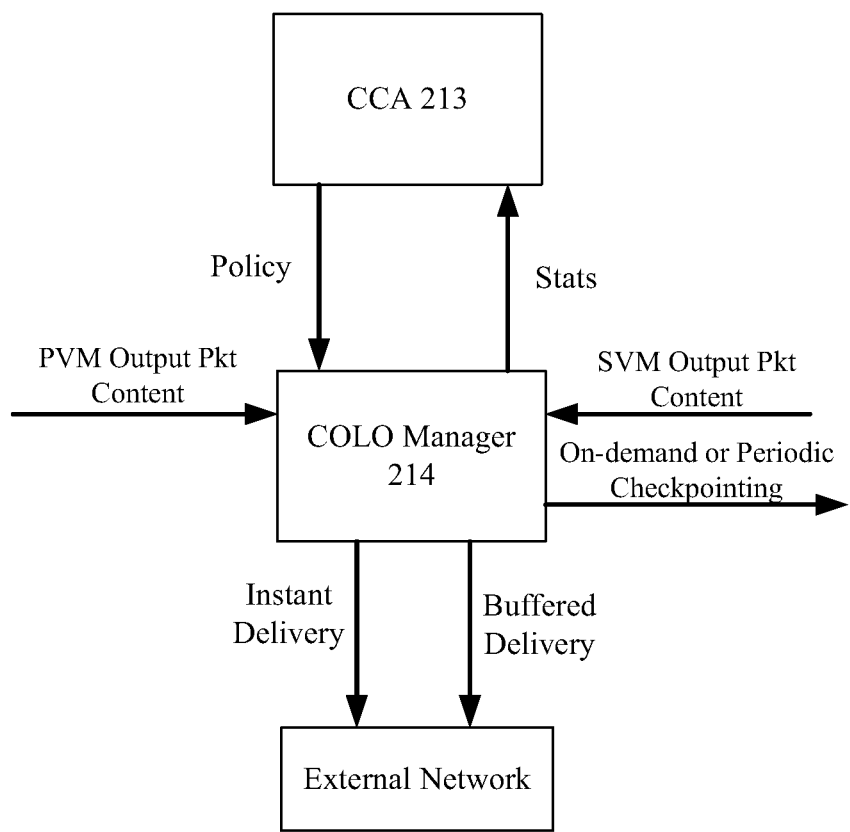
FIG. 2 illustrates an example second system.

FIG. 2 illustrates an example second system. As shown in FIG. 2, the second system includes system 200. System 200 as shown in FIG. 2 depicts example interactions between a COLO manager 214 and a CCA 213 for outputted packets to be delivered to an external network. According to some examples, COLO manager 214 and CCA 213 may facilitate implementation of a VM replication scheme involving the use of one or more PVM/SVM combinations as mentioned above for FIG. 1.

In some examples, as shown in FIG. 2, PVM output packet (pkt) contents and SVM output packet contents may be received by COLO manager 214. These output packet contents may have been outputted by one or more VMs, each VM hosted by separate nodes or servers of a data center. For these examples, logic and/or features of COLO manager 214 may be capable of determining output-packet-similarity based on one or more time intervals or durations via which the output packet contents from the PVM matches the output packet contents from the SVM. Statistical information (stats) may be gathered to indicate output-packet-similarity and/or to indicate trends associated with output-packet-similarity. Stats may include, but are not limited to, the one or more time intervals or times of day associated with the one or more time intervals. As shown in FIG. 2, in some examples, stats may be conveyed to CCA 213. The stats may be conveyed on a periodic basis, event triggered basis (e.g., output packet threshold) and/or a continual basis (e.g., following each time interval determination).

According to some examples, logic and/or features of CCA 213 may determine a CP/D policy for outputted packets from the PVM and the SVM based, at least in part, on the stats received from COLO manager 214. The CP/D policy may be sent to COLO manager 214 and may indicate or provide criteria for COLO manager 214 to select between an instant mode or a buffered mode. Logic and/or features at COLO manager 214 may also be capable of informing or notifying a COLO manager located with the SVM of which CP/D mode was selected.

In some examples, the CP/D policy may be based on a level of output-packet-similarity indicated by the stats received from COLO manager 214. For example, a higher level of output-packet-similarity may indicate longer time durations between checkpointing actions (e.g., due to unmatched output packet contents). Based on these longer time durations, CCA 213 may set a policy that defines an interval threshold between a number of consecutive checkpoint actions that characterizes output-packet-similarity as a higher level of output-packet-similarity if one or an average of time intervals are above the interval threshold.

According to some examples, in addition to setting the interval threshold, the number of consecutive checkpoint actions may also be based on characteristics associated with output-packet-similarity indicated by the stats received from COLO manager 214. For example, large fluctuations in the length of time intervals over different times of a given day may have a higher number of consecutive checkpoints while small fluctuations may have a lower number of consecutive checkpoints, provided that fluctuations result in time intervals fluctuating above and below the interval threshold.

In some examples, separate time intervals included in stats received form COLO manager 214 may indicate a high level of output-packet similarity for a threshold number of separate checkpoint actions. The threshold number of separate checkpoint actions (e.g., 10) may be determined according to an administrative preference for a given workload for the PVM or SVM. For these examples, the CP/D policy indicated by CCA 213 may indicate to COLO manager 214 to select instant mode based on the separate time intervals indicating the higher level of output-packet-similarity for the threshold number of separate checkpoint actions. For example, if an administrative preference is for high throughput and low network latency during times of the day where the given workload is high, instant mode may be more desirable. Hence, the threshold number of separate checkpoint actions having a higher level of output-packet-similarity may be set lower compared to another administrative preference for high fault tolerance even when the given workload is high. For high fault tolerance, the threshold number of separate checkpoint actions having the higher level of out-put-packet-similarity needed for selection of instant mode would be higher. The higher threshold number may result in buffered mode being selected by COLO manager 214 more often.

According to some examples, average time intervals between consecutive checkpoint actions for outputted packets may be compared to the interval threshold established by CCA 213 to characterize output-packet-similarity as high or low. For these examples, the CP/D policy indicated by CCA 213 may indicate to COLO manager 214 to select instant mode based on an average time interval between a number of consecutive checkpoint actions being greater that the interval threshold (e.g., 40 ms). The CP/D policy may also indicate to COLO manager 214 to select buffered mode if the average time interval between the number of consecutive checkpoint actions is equal to or below the interval threshold.

In some examples, the CP/D policy may indicate to COLO manager 214 to select instant mode as long as at least one time interval between a number of consecutive checkpoint actions is greater than an interval threshold. Otherwise, COLO manager 214 may select periodic CP/D mode.

FIG. 3 illustrates an example first database. As shown in FIG. 3, the example first database includes database 300. In some examples, database 300 may include information received from a COLO manager such as COLO manager 114 or 214 that indicates output-packet-similarity between a PVM and an SVM. Database 300 may be maintained by a CCA such as CCA 113 or 213 and may also include information that maintains historical statistical information for historical output-packet-similarity. The CCA may include logic and/or features to use information and historical output-packet-similarity information to set or determine CP/D policies.

According to some examples, as shown in FIG. 3, database 300 may include historical statistical information to include one or more time intervals observed by a COLO manager for individual or separate checkpoint actions conducted by the COLO manager. For example, as shown in FIG. 3, database 300 includes time intervals of 1 second (s), 2 s, 25 ms and 40 ms for respective checkpoint #'s 1, 2, 3 to m, where "m" is any positive whole integer greater than 3. Examples are not limited to information shown in FIG. 3 for database 300. More or less information may be included in a database maintained by a CCA for use to determine or set a CP/D policy. Also, although not shown in FIG. 3, multiple time intervals may be associated with a single checkpoint action.

In some examples, a shorter time interval may indicate lower output-packet-similarity for the PVM and the SVM and a longer time interval may indicate higher output-packet similarity.

According to some examples, A CCA may calculate or determine an average time interval in last N seconds/minutes/hours/checkpoints, where "N" is any positive integer. The CCA may then determine an appropriate CP/D policy based on the average time interval in the last N seconds/minutes/hours/checkpoints.

Figure 4:
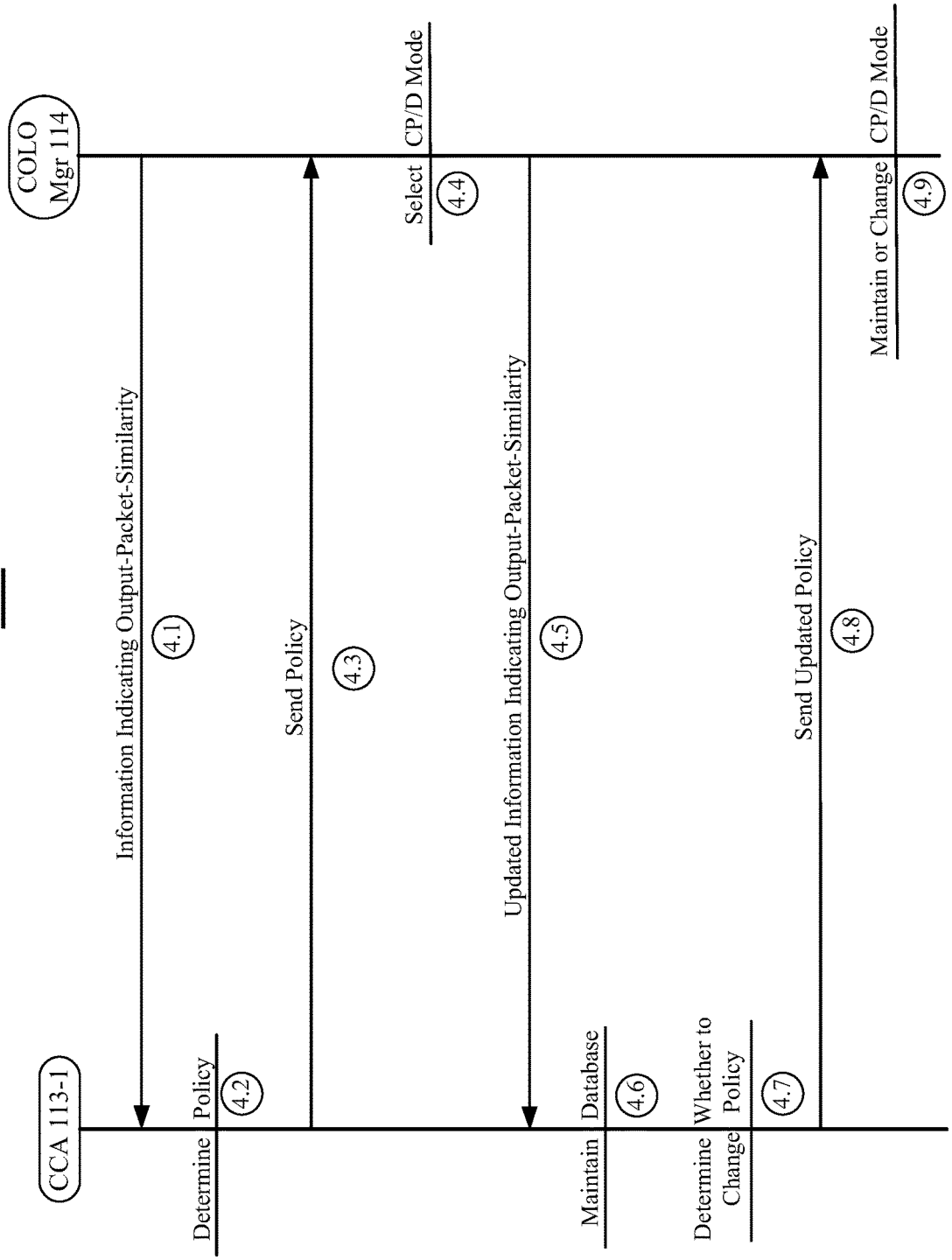
FIG. 4 illustrates an example first process.

FIG. 4 illustrates a first example process. In some examples, as shown in FIG. 4, the first example process includes process 400. Process 400 may be for determining a CP/D policy to select a CP/D mode. For these examples, elements of system 100 or system 200 as shown in FIG. 1 or 2 such as CCA 113-1/213 and COLO manager (mgr) 114/214 may be related to process 400. Also database 300 as shown in FIG. 3 may also be related to process 400. However, the example process 400 is not limited to implementations using elements of system 100, system 200 or database 300 shown in FIGS. 1-3.

Beginning at process 4.1 (Information Indicating Output-Packet-Similarity), logic and/or features at CCA 113-1 may receive information from COLO manager 114 indicating out-packet-similarity between PVM 112-1 hosted by server 110 and SVM 122-1 hosted by server 120. In some examples, the output-packet-similarity may include separate time intervals via which content matched for output packets from PVM 112-1 and SVM 122-1 before a checkpoint action was conducted.

Moving to process 4.2 (Determine Policy), logic and/or features at CCA 113-1 may determine a CP/D policy for outputted packets based on the information received from COLO manager 114.

Moving to process 4.3 (Send Policy), logic and/or features at CCA 113-1 may then send the CP/D policy to COLO manager 114.

Moving to process 4.4 (Select CP/D Mode), logic and/or features at COLO manager 114 may select a CP/D mode based, at least in part, on the CP/D policy. According to some examples, the CP/D mode may include instant mode or buffered mode.

Moving to process 4.5 (Updated Information Indicating Output-Packet-Similarity), logic and/or features at COLO manager 114 may send updated information to CCA 113-1. The updated information may indicate output-packet-similarity between PVM 112-1 hosted by server 110 and SVM 122-1 hosted by server 120. In some examples, the updated information may be sent on a periodic basis, continual basis or based on a triggering event.

Moving to process 4.6 (Maintain Database), logic and/or features at CCA 113-1 may maintain a database that includes the information and the updated information. According to some examples, the database may include information similar to database 300.

Moving to process 4.7 (Determine Whether to Change Policy), logic and/or features at CCA 113-1 may determine whether to update the CP/D policy based on the updated information and/or based on historical statistical information.

Moving to process 4.8 (Send Updated Policy), logic and/or features at CCA 113-1 may determine to change the CP/D policy based on the updated information and/or the historical statistical information and then sends an updated CP/D policy to COLO manager 214.

Moving to process 4.9 (Maintain or Change CP/D Mode), logic and/or features at COLO manager 114 may then determine whether to change the previously selected CP/D mode based on the updated CP/D mode received from CCA 113-1. Process 400 may return to process 4.5 following COLO manager 114 sending additional updated information indicating output-packet-similarity.

Figure 5:
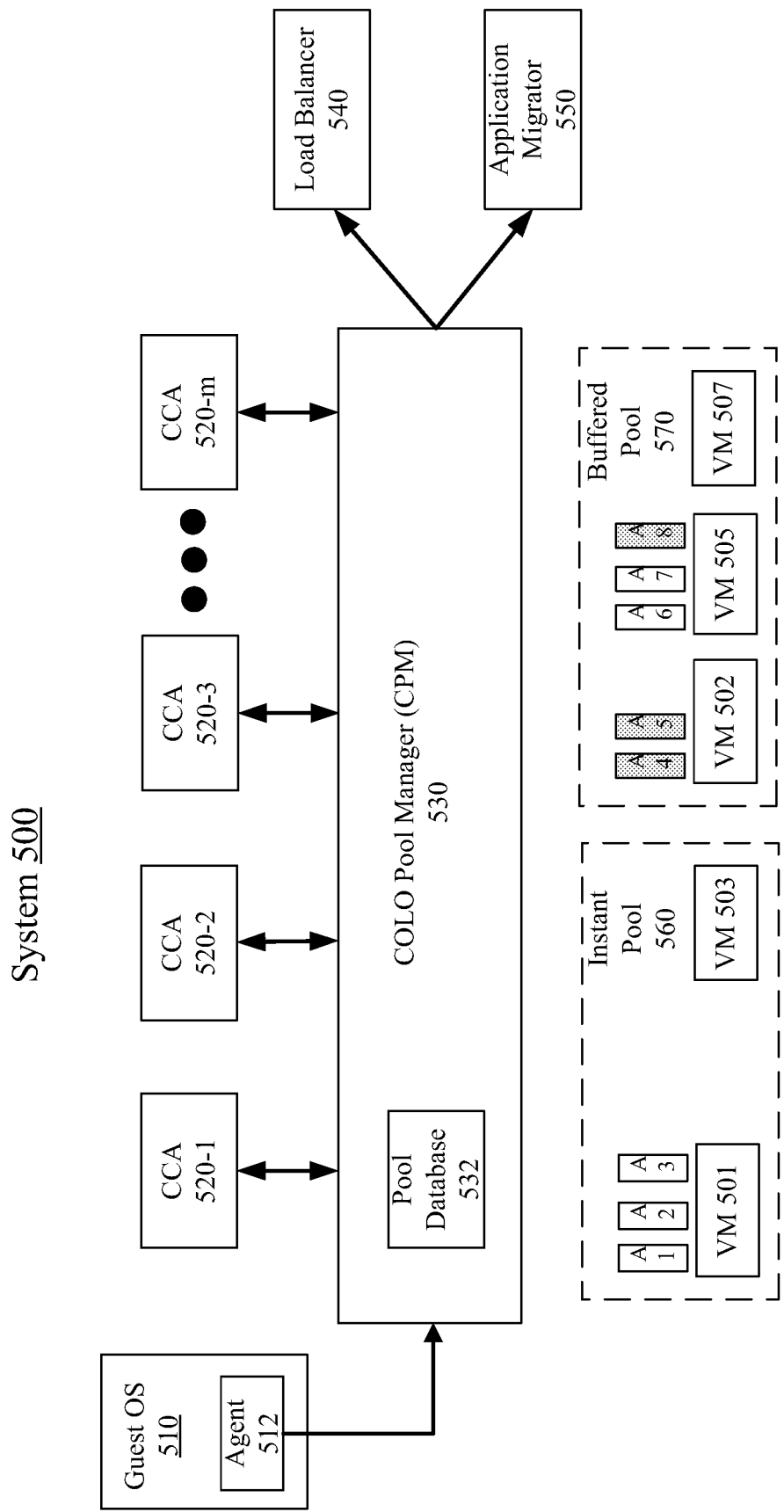
FIG. 5 illustrates an example third system.

FIG. 5 illustrates an example third system. In some examples, as shown in FIG. 5, the third system includes system 500. System 500 as shown in FIG. 5 includes an agent 512 of a guest operating system (OS) 510 and CCAs 520-1 to 520-m which may be arranged to respectively send or receive information to/from a COLO pool manager (CPM) 530. CPM 530 may run on a separate node, or in one of the nodes including a given COLO manager/CCA. CPM 530 may manage at least a portion of VMs included in a data center by including VMs of PVM/SVM combinations in either an instant pool 560 or a buffered pool 570. According to some examples, CPM 530 may include logic and/or features to add a PVM and an SVM to one of instant pool 560 or buffered pool 570 based on which CP/D mode the applicable COLO manager has selected for the PVM and the SVM as communicated to a CCA from among CCAs 520-1 to 520-m. CPM 530 may also include logic and/or features to assess whether to migrate one or more applications executed by the PVM and the SVM to another PVM/SVM. The logic and/or features of CPM 530, based on the assessment, may then cause either load balancer 540 or application manager 540 to implement a migration of the one or more applications.

In some examples, CCAs 520-1 to 520-m may exchange stats and policy information with respective COLO managers for setting CP/D policies and/or selecting a CP/D mode as described above for FIGS. 1-4. CCAs 520-1 to 520-m may relay at least portions of stat information gathered from respective COLO managers as well as selected CP/D modes to CPM 530. According to some examples, CPM 530 may include logic and/or features to add this information to a pool database 532.

In some examples, pool database 532 may also include additional information regarding output-packet-similarity for VMs included in a data center (e.g., data center 105). The additional information may be received from agent 512 located at guest OS 510. The additional information may include application to TCP connection(s) mapping for each VM in the data center or at least a portion of the VMs supported by guest OS 510. Agent 512 may send this additional information to CPM 530 responsive to observed changes in application/TCP connection(s) mapping, responsive to periodic time intervals or responsive to a triggering event (e.g., system reset, newly provisioned VMs, application migration, etc.).

According to some examples, CPM 530 may include logic and/or features to maintain pool database 532 to include information to indicate output-packet-similarity for applications A1 to A3 executed or running on VM 501, applications A4, A5 executed or running on VM 502 or applications A6 to A8 executing or running on VM 507. The logic and/or features of CPM 530 may also be capable of including information that takes advantage of mapping information for applications and TCP connections received from agent 512.

According to some examples, instant pool 560 may include VMs from PVMs/SVMs executing applications having outputs that may primarily have a higher level of output-packet-similarity. For example, applications A1, A2 and A3 may outputs with a high level of output-packet-similarity (e.g., time intervals for matching output content are greater than 40 ms). The higher level of output-packet-similarity may be indicated by no shading in the boxes including A1, A2 and A3 as shown in FIG. 5. The higher level of output-packet-similarity may cause the associated COLO manager to select an instant mode for VM 501 so CPM 530 may add VM 501 to instant pool 560.

In some examples, buffered pool 570 may include VMs from PVMs/SVMs executing applications having outputs that may primarily have a lower level of output-packet-similarity (e.g., time intervals for matching output content are 40 ms or less). For example, applications A4 and A5 may have outputs with a lower level of output-packet-similarity. The lower level of output-packet-similarity may be indicated by shading in the boxes including A4 and A5. Also, although VM 505 includes applications A6 and A7 having no shading, application A8 has shading. The output-packet-similarity of outputs for application A8 may be so low that the overall level of output-packet similarity for VM 505 causes the associated COLO manager to select buffered mode for VM 505. As a result of buffered mode being selected for VM 505, CPM 530 may add VM 505 to buffered pool 570.

Figure 6:
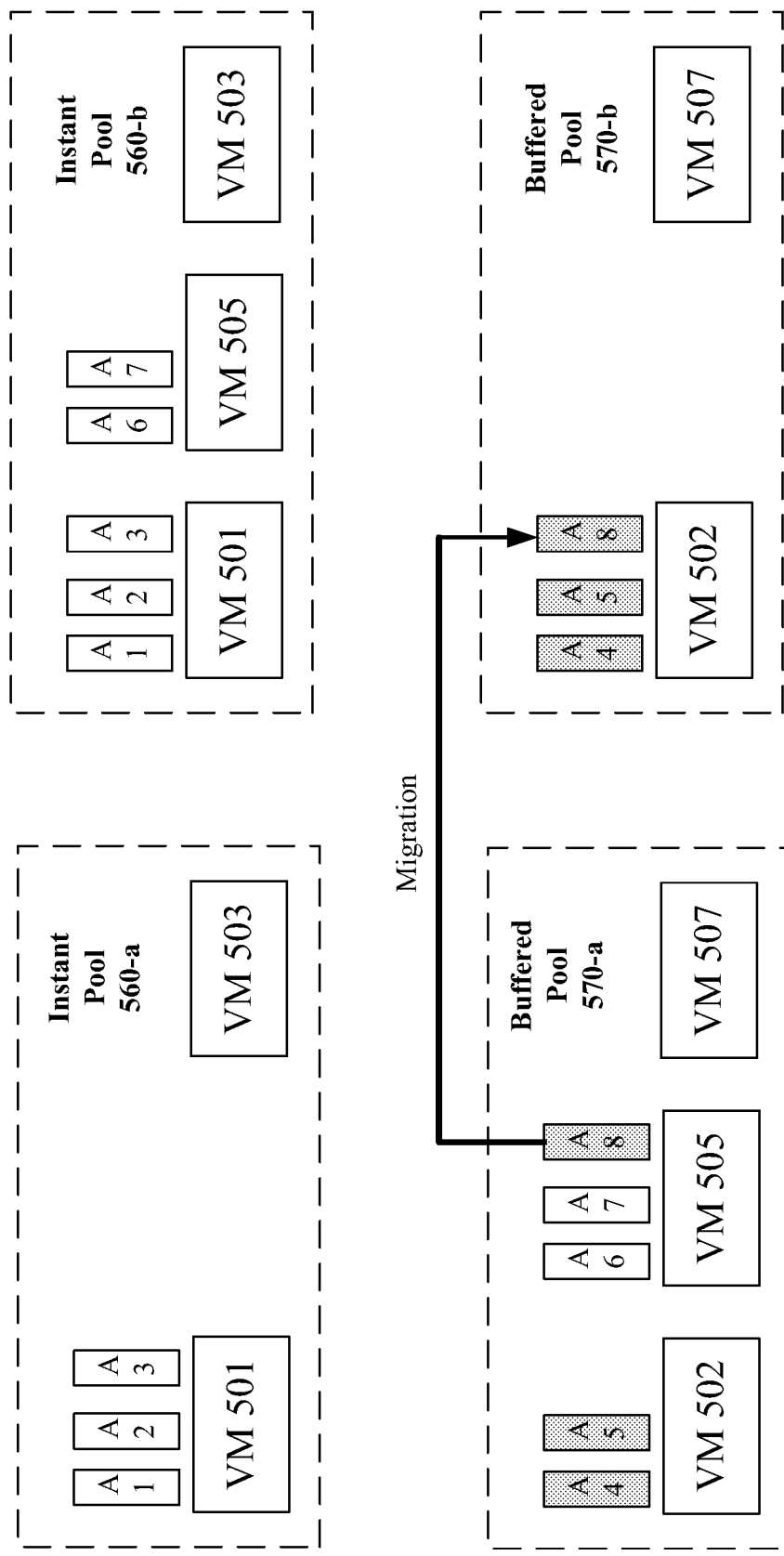
FIG. 6 illustrates an example scheme.

FIG. 6 illustrates an example scheme 600. In some examples, as shown in FIG. 6 and mentioned above for FIG. 5, VMs 501, 502, 503, 505 and 507 may be added by CPM 530 to pools based on which CP/D mode has been selected by an applicable COLO manager. As mentioned previously and as shown in FIG. 6, the pools may include instant pool 560 and buffered pool 570.

According to some examples, CPM 530 may include logic and/or features to assess whether to migrate applications from one VM to another VM. For example, the logic and/or features may assess whether application A8 should be migrated to another VM to allow VM 505 to be moved from buffered pool 570 to instant pool 560. As mentioned above, applications A6 and A7 may have outputs with a high output-packet-similarity. In some examples, the logic and/or features of CPM 530 may cause migration of application A8 if the overall output-packet-similarity for outputs of the remaining applications reaches a threshold level (e.g., time interval(s) greater than 40 ms).

As shown in FIG. 6, scheme 600 shows migration of A8 from VM 505 at buffered pool 570-a to VM 502 at buffered pool 570-b. This migration, for example, may cause CPM 530 to include VM 505 in instant pool 560-b following the migration of application A8. Migration, for example, may be coordinated with load balancer 540 or application migrator 550.

FIG. 7 illustrates an example second database. As shown in FIG. 7, the example second database includes database 700. In some examples, database 700 may include information used by a CPM such as CPM 530 to assess whether to migrate an application from a first VM serving as either a first PVM or a second SVM to a second VM serving as either a second PVM or second SVM. For example, the migration of the application may occur if the first VM can be moved from a buffered pool to an instant pool if migration will result in a high enough level of output-packet-similarity (which may benefit more from the instant mode) for remaining application(s) outputs at the first VM. The higher level of output-packet similarity post-migration maybe high enough (e.g., ave. matching time interval >40 ms) to cause a COLO manager to select an instant mode for the first VM.

In some examples, as shown in FIG. 7, database 700 may include CCA information 710 and agent information 720 for VM 505. As mentioned above for FIG. 5, VM 505 may host or execute applications A6, A7 and A8. CCA information 710 may include statistical information related to VM 505 as reported to a CPM such as CPM 530 by a CCA capable of setting a CP/D policy used by a COLO manager monitoring output from VM 505. Agent information 720 may include application/TCP connection(s) mapping information for applications A6 to A8 that indicates which TCP connection(s)/port(s) these applications are mapped to as observed by an agent at a guest OS such as agent 512 mentioned above for FIG. 5.

In some examples, as shown in FIG. 7, CCA information 710 may indicate that a certain TCP connection may be associated with relatively short time intervals for VM 505 arranged as a PVM or an SVM. For example, CCA information 710 indicates that TCP connection 1 has time intervals of 25 ms and 40 ms compared to the longer time intervals of 50 ms an 45 ms for TCP connections 5 and 102, respectively. Also, agent information 720 indicates that application A8 is mapped to at least TCP connection 1, A6 is mapped to at least TCP connection 5 and A7 is mapped to at least TCP connection 102. Thus, application A8 that outputs to TCP connection 1 has a lower output-packet-similarity due to the relatively shorter time intervals compared to applications A6 and A7 that output to TCP connections 5 and 102, respectively.

According to some examples, the CPM may assess whether migrating A8 may raise the ave. time interval to potentially cause a COLO manager for VM 105 to select an instant mode for VM 505. For example, if the ave. time interval after migrating application A8 is greater than a 40 ms threshold level, then the CPM may cause A8 to be migrated to another VM (e.g., VM 502). Based on the time intervals shown in FIG. 7, migration of A8 would raise the ave. time interval for outputs of A6 and A7 above the 40 ms threshold level. Following migration of A8, the CPM may then remove VM 505 from buffered pool 570 and add VM 505 to instant pool 560.

Examples are not limited to a database 700 including CCA information 710 and agent information 720 as shown in FIG. 7. More or less information may be included in a database maintained by a CPM for use to assess whether to migrate an application between VMs.

According to some examples, database 700 may also keep track of historical information that may cause the CPM to move VMs in or out of pools based on work load trends during a given day. For example, all three VMs shown in FIG. 7 have long enough time durations during low time periods to possibly justify movement to the instant pool during these low time periods.

Figure 8:
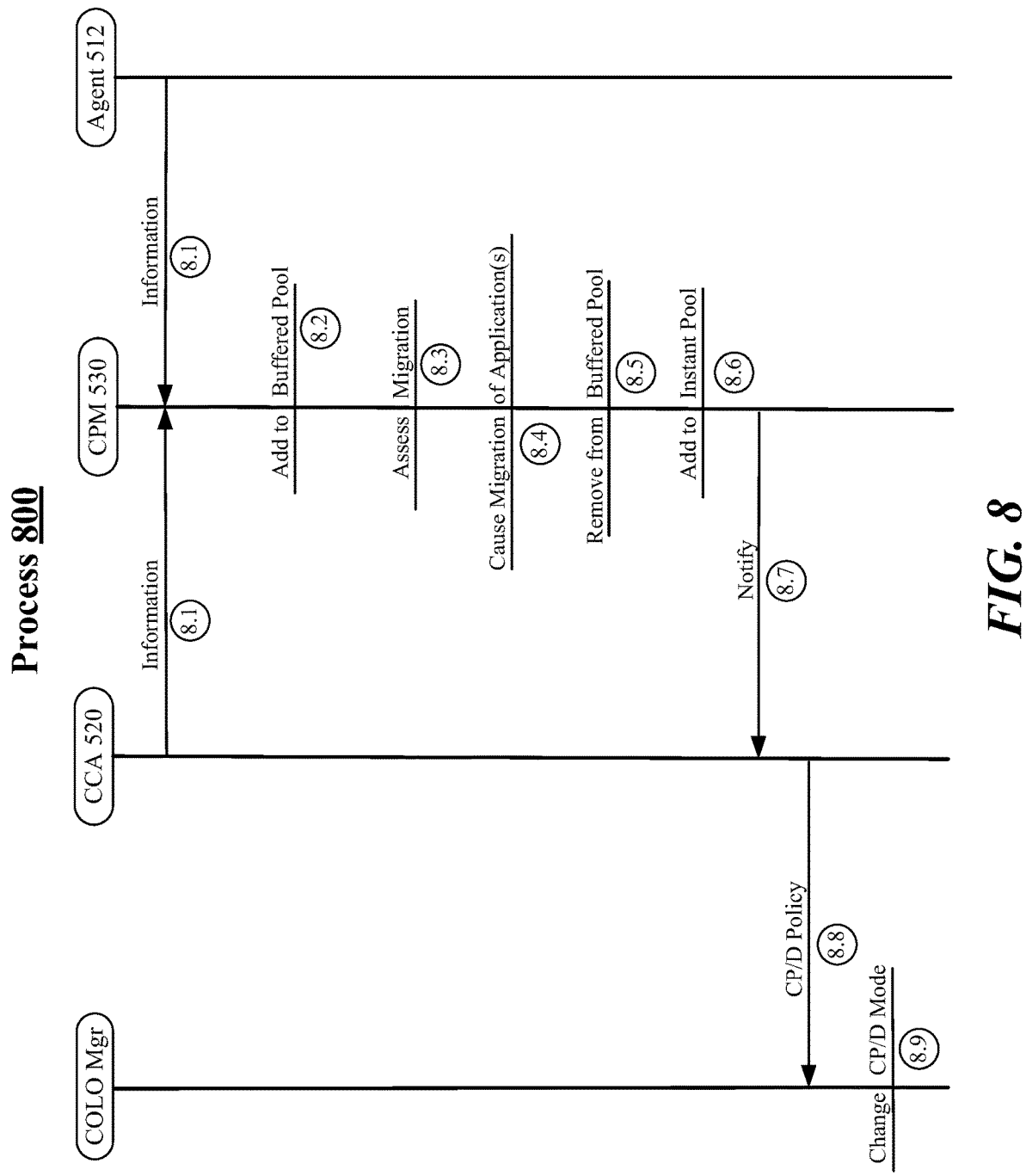
FIG. 8 illustrates an example second process.

FIG. 8 illustrates a second example process. In some examples, as shown in FIG. 8, the second example process includes process 800. Process 800 may be for adding or removing a VM to a pool and/or causing applications to be migrated between VMs to enable movement of VMs between pools. For these examples, elements of system 500 as shown in FIG. 5 such as agent 512, CCA 520 or CPM 530 may be related to process 800. Scheme 600 in FIG. 6 or database 700 as shown in FIG. 7 may also be related to process 800. However, the example process 800 is not limited to implementations using elements of system 500, scheme 600 or database 700 shown in FIGS. 5-7.

Beginning at process 8.1 (Information), logic and/or features of CCA 520 and agent 512 may send information to CPM 530. The information from CCA 520 may indicate current CP/D policies or modes in use by CCA 520 or the COLO manager. The information from CCA 520 may also include information similar to CCA information 710 for database 700 that may include statistical information indicating output-packet-similarities for a VM for a PVM/SVM being monitoring/controlled by CCA 520 and the COLO manager. The information from agent 512 may be similar to agent information 720 for database 700 that may include application/TCP connection(s) mapping information.

Moving to process 8.2 (Add to Buffered Pool), logic and/or features of CPM 530 may determine that the VM for the PVM/SVM should be added to the buffered pool based on an indication of a CP/D mode used by the COLO manager for the PVM and the SVM as included in the information received from CCA 520.

Moving to process 8.3 (Assess Migration), logic and/or features of CPM 530 may assess whether one or more applications executed or hosted by the VM for the PVM or the SVM should be migrated to another VM for another PVM/SVM to allow the VM to have a higher output-packet-similarity for outputted packets generated by remaining applications executed by the PVM and the SVM following migration. According to some examples, an ave. time interval above a threshold time interval (e.g., ave. time interval >40 ms) may need to be reached before determining that a migration should be caused.

In some examples, if no migration, process 800 may move to process 8.1.

Moving to process 8.4 (Migration of Application(s)), logic and/or features of CPM 530 may decide to migrate one or more applications to the other VM for the other PVM/SVM and thus cause a migration of the one or more applications to the other PVM/SVM.

Moving to process 8.5 (Remove from Buffered Pool), logic and/or features of CPM 530 may now remove the VM for the PVM or SVM from the buffered pool.

Moving to process 8.6 (Add to Instant Pool), logic and/or features of CPM 530 may now add the VM for the PVM or SVM to the instant pool.

Moving to process 8.7 (Notify), logic and/or features of CPM 530 may send a notification to CCA 520 to cause CCA 520 to modify the CP/D policy. CCA 520, without a notification, may also modify the CP/D policy since output-packet-similarity changes enough due to the migration of the application to justify the modification of the CP/D policy.

Moving to process 8.8 (CP/D Policy), logic and/or features of CCA 520 may send the modified CP/D policy to the COLO manager.

Moving to proves 8.16 (Change CP/D mode), logic and/or features of the COLO manager may change the CP/D mode responsive to receiving the changed CP/D policy. The process 800 may then return to process 8.1.

Figure 9:
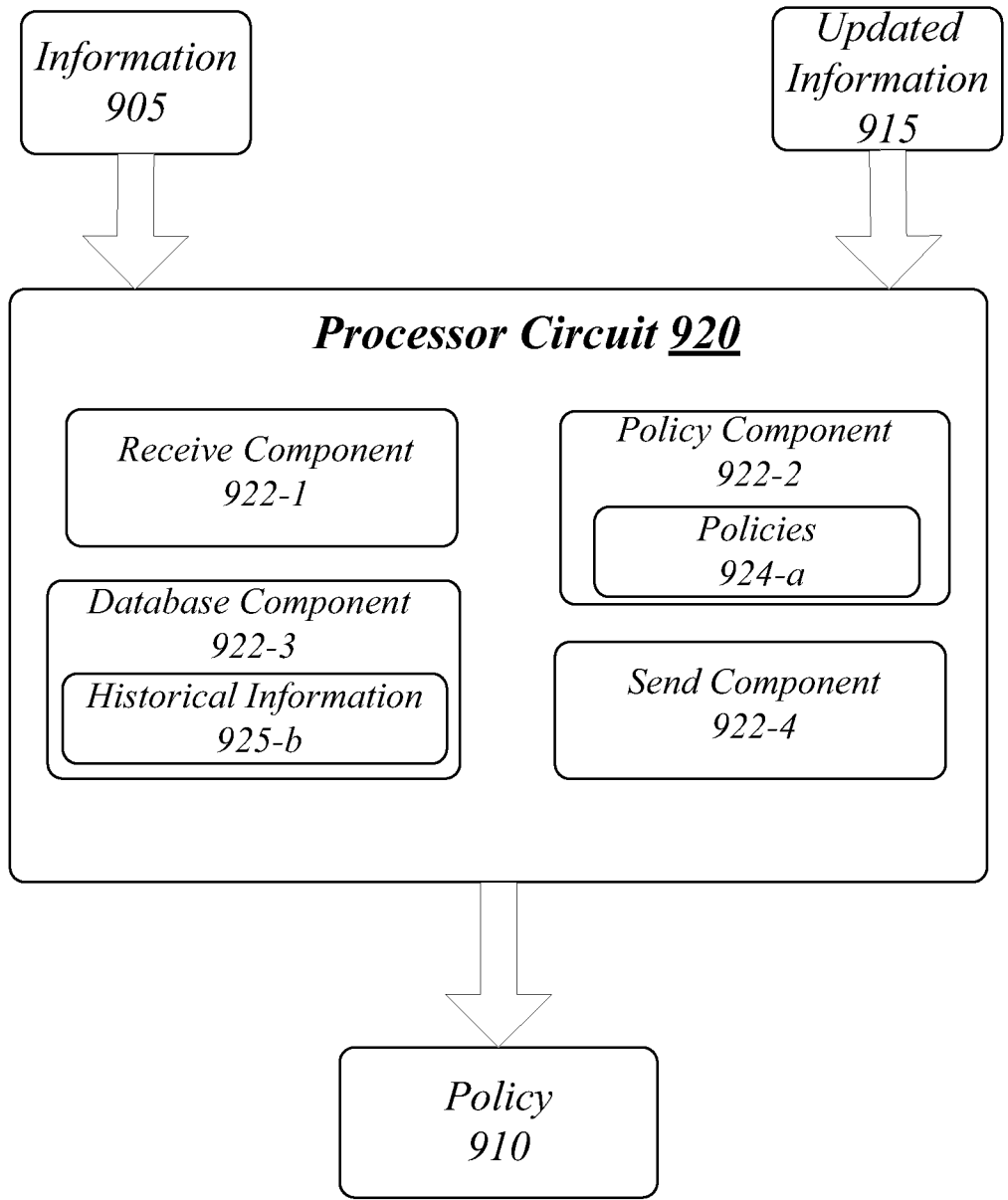
FIG. 9 illustrates an example block diagram for a first apparatus.

FIG. 9 illustrates an example block diagram for a first apparatus. As shown in FIG. 9, the first apparatus includes an apparatus 900. Although apparatus 900 shown in FIG. 9 has a limited number of elements in a certain topology, it may be appreciated that the apparatus 900 may include more or less elements in alternate topologies as desired for a given implementation.

The apparatus 900 may be supported by processor circuit 920 maintained at a node or server computing device (e.g., included in a data center). Processor circuit 920 may be arranged to execute one or more software or firmware implemented modules or components 922-$a$. It is worthy to note that "a" and "b" and "c" and similar designators as used herein are intended to be variables representing any positive integer. Thus, for example, if an implementation sets a value for a=4, then a complete set of software or firmware for components 922-$a$ may include components 922-1, 922-2, 922-3, or 922-4. The examples presented are not limited in this context and the different variables used throughout may represent the same or different integer values. Also, these "components" may be software/firmware stored in computer-readable media, and although the components are shown in FIG. 9 as discrete boxes, this does not limit these components to storage in distinct computer-readable media components (e.g., a separate memory, etc.).

According to some examples, processor circuit 920 may include a processor or processor circuitry. Processor circuit 920 may be part of host processor circuit at a server (e.g., primary node/server 110, secondary node/server 120) that may include processing cores or elements. The processor circuit including one or more processing cores can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Atom®, Celeron®, Core (2) Duo®, Core i3, Core i5, Core i7, Itanium®, Pentium®, Xeon®, Xeon Phi® and XScale® processors; and similar processors. According to some examples processor circuit 920 may also include an application specific integrated circuit (ASIC) and at least some components 922-$a$ may be implemented as hardware elements of the ASIC.

According to some examples, apparatus 900 may be at a server coupled with an exterior network. The server may be arranged to host a PVM or an SVM capable of separately executing one or more applications.

In some examples, apparatus 900 may include a receive component 922-1. Receive component 922-1 may be executed by processor circuit 920 to receive information indicating output-packet-similarity between a PVM hosted by a first server and an SVM hosted by a second server. The output-packet-similarity may include separate time intervals via which content matched for output packets from the PVM and the SVM. For these examples, the information may be included in information 905.

According to some examples, apparatus 900 may also include a policy component 922-2. Policy component 922-2 may be executed by processor circuit 920 to determine a CP/D policy for outputted packets based on the information.

For these examples, policy component 922-2 may maintain policy criteria in policies 924-a (e.g., a data structure such as a lookup table (LUT). The policy criteria, for example, may include interval thresholds between a number of consecutive checkpoint actions that may trigger a selection of a CP/D mode.

In some examples, apparatus 900 may also include a database component 922-3. Database component 922-3 may be executed by processor circuit 920 to maintain information received via information 905 as well as updated information received via updated information 915. For these examples, database component 922-3 may maintain the information and the updated information with historical information 925-b (e.g., in a database). Historical information 925-b may include historical statistical information for output-packet-similarity between the PVM and the SVM. Policy component 922-2 may have access to historical information 925-b and may determine checkpoint/delivery policies based, at least in part, on historical information 925-b.

According to some examples, apparatus 900 may also include a send component 922-4. Send component 922-4 may be executed by processor circuit 920 to send the CP/D policy to a COLO manager for the COLO manager to select a CP/D mode based, at least in part, on the CP/D policy. The CP/D policy may be included in policy 910.

Various components of apparatus 900 and a device implementing apparatus 900 may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Example connections include parallel interfaces, serial interfaces, and bus interfaces.

Included herein is a set of logic flows representative of example methodologies for performing novel aspects of the disclosed architecture. While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

A logic flow may be implemented in software, firmware, and/or hardware. In software and firmware embodiments, a logic flow may be implemented by computer executable instructions stored on at least one non-transitory computer readable medium or machine readable medium, such as an optical, magnetic or semiconductor storage. The embodiments are not limited in this context.

FIG. 10 illustrates an example of a first logic flow. As shown in FIG. 10 the first logic flow includes a logic flow 1000. Logic flow 1000 may be representative of some or all of the operations executed by one or more logic, features, or devices described herein, such as apparatus 900. More particularly, logic flow 1000 may be implemented by at least receive component 922-1, policy component 922-2 or send component 922-4.

According to some examples, logic flow 1000 at block 1002 may receive, at a processor circuit, information indicating output-packet-similarity between a PVM hosted by a first server and an SVM hosted by a second server. The output-packet-similarity including separate time intervals via which content matched for output packets for the PVM and the SVM. For these examples, receive component 922-1 may receive the information.

In some examples, logic flow 1000 at block 1004 may determine a CP/D policy for outputted packets based on the information. For these examples, policy component 922-2 may determine the CP/D policy.

According to some examples, logic flow 1000 at block 1006 may send the CP/D policy to a COLO manager for the COLO manager to select a CP/D mode based, at least in part, on the CP/D policy. For these examples, send component 922-4 may send the CP/D policy to the COLO manager.

FIG. 11 illustrates an example of a first storage medium. As shown in FIG. 11, the first storage medium includes a storage medium 1100. The storage medium 1100 may comprise an article of manufacture. In some examples, storage medium 1100 may include any non-transitory computer readable medium or machine readable medium, such as an optical, magnetic or semiconductor storage. Storage medium 1100 may store various types of computer executable instructions, such as instructions to implement logic flow 1000. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 12:
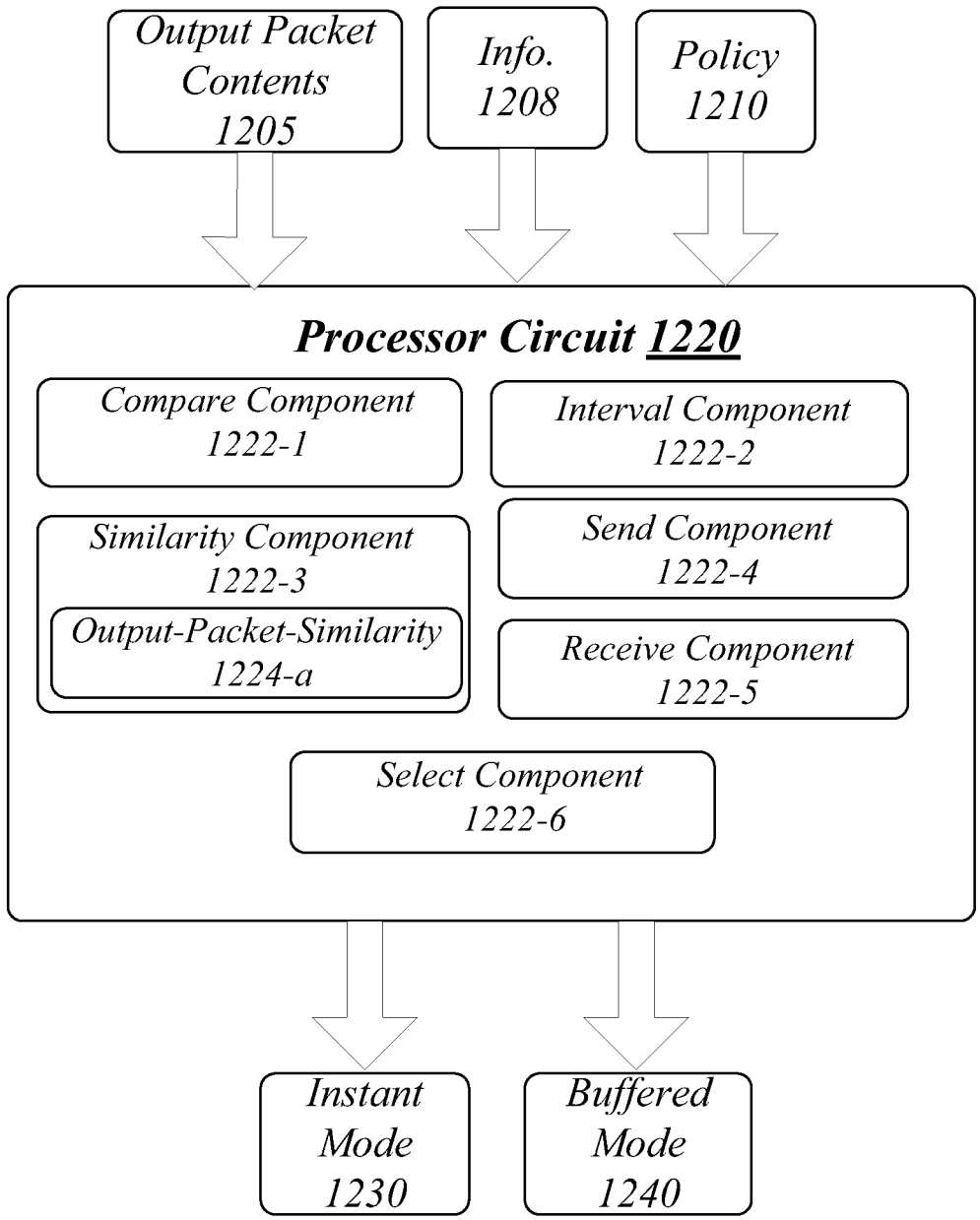
FIG. 12 illustrates an example block diagram for a second apparatus.

FIG. 12 illustrates a block diagram for an example second apparatus. As shown in FIG. 12, the example second apparatus includes apparatus 1200. Although apparatus 1200 shown in FIG. 12 has a limited number of elements in a certain topology, it may be appreciated that the apparatus 1200 may include more or less elements in alternate topologies as desired for a given implementation.

The apparatus 1200 may be supported by processor circuit 1220 maintained at a node or server (e.g., included in a data center). Processor circuit 1220 arranged to execute one or more software components 1222-a. It is worthy to note that "a" and "b" and "c" and similar designators as used herein are intended to be variables representing any positive integer. Thus, for example, if an implementation sets a value for a=6, then a complete set of software components 1222-a may include components 1222-1, 1222-2, 1222-3, 1222-4, 1222-5 or 1222-6. The examples are not limited in this context.

In some examples, as shown in FIG. 12, apparatus 1200 includes processor circuit 1220. Processor circuit 1220 may be generally arranged to execute one or more software components 1222-a. The processing circuit 1220 can be any of various commercially available processors to include but not limited to the processors mentioned above for apparatus 900. Also, according to some examples, processor circuit 1220 may also be an ASIC and at least some components 1222-*a* may be implemented as hardware elements of the ASIC.

According to some examples, apparatus 1200 may be at a server coupled with an exterior network via a plurality of TCP connections. The server may be arranged to host a PVM or an SVM capable of separately executing one or more applications.

In some examples, apparatus 1200 may include a compare component 1222-1. Compare component 1222-1 may be executed by processor circuit 1220 to compare output packet contents from a PVM hosted by a first server with output packet contents from an SVM. The output packet contents may be received with output packet contents 1205.

According to some examples, apparatus 1200 may also include an interval component 1222-2. Interval component 1222-2 may be executed by processor circuit 1220 to determine one or more time intervals via which the output packet contents match.

In some examples, apparatus 1200 may also include a similarity component 1222-3. Similarity component 1222-3 may be executed by processor circuit 1220 to update information indicating output-packet-similarity between the PVM and the SVM based on the one or more time intervals. For these examples, similarity component 122-3 may at least temporarily maintain this updated information with output-packet-similarity 1224-*a* (e.g., in a LUT).

According to some examples, apparatus 1200 may also include a send component 1222-4. Send component 1222-4 may be executed by processor circuit 1220 to send the updated information to a CCA for the CCA to determine a CP/D policy for outputted packets generated by the one or more applications executed by the PVM and the SVM. For these examples, the updated information may be included in information 1208.

In some examples, apparatus 1200 may also include a receive component 1222-5. Receive component 1222-5 may be executed by processor circuit 1220 to receive the determined CP/D policy from the CCA. For these examples the policy may be included in policy 1210.

According to some examples, apparatus 1200 may also include a select component 1222-6. Select component 1222-6 may be executed by processor circuit 1220 to select a CP/D mode based, at least in part, on the CP/D policy. For these examples, select component 1222-3 may select instant or buffered mode. Instant mode 1230 indicates instant mode selection. Buffered mode 1240 indicates buffered mode selection.

Various components of apparatus 1100 and a device implementing apparatus 1100 may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Example connections include parallel interfaces, serial interfaces, and bus interfaces.

FIG. 13 illustrates an example of a second logic flow. As shown in FIG. 11 the second logic flow includes a logic flow 1300. Logic flow 1300 may be representative of some or all of the operations executed by one or more logic, features, or devices described herein, such as apparatus 1200. More particularly, logic flow 1300 may be implemented by at least compare component 1222-1, interval component 1222-2, similarity component 1222-3, send component 1222-4, receive component 1222-5 or select component 1222-6.

According to some examples, logic flow 1300 at block 1302 may compare, at a processor circuit, output packet contents from a PVM hosted by a first server with output packet contents from an SVM hosted by a second server. For these examples, compare component may compare the output packet contents.

In some examples, logic flow 1300 at block 1304 may determine one or more time intervals via which the output packet contents match. For these examples, interval component 1222-2 may determine the one or more time intervals.

According to some examples, logic flow 1300 at block 1306 may update information indicating output-packet-similarity between the PVM and the SVM based on the one or more time intervals. For these examples, similarity component 1222-3 may update the information.

In some examples, logic flow 1300 at block 1308 may send the updated information to a CCA for the CCA to determine a CP/D policy for outputted packets from the PVM and the SVM. For these examples, send component 1212-4 may send the updated information.

According to some examples, logic flow 1300 at block 1310 may receive the determined CP/D policy from the CCA. For these examples, send component may receive the CP/D policy.

In some examples, logic flow 1300 at block 1312 may select a CP/D mode based, at least in part, on the CP/D policy. For these examples, select component 1222-6 may select the mode.

FIG. 14 illustrates an example of a second storage medium. As shown in FIG. 14, the second storage medium includes a storage medium 1400. The storage medium 1400 may comprise an article of manufacture. In some examples, storage medium 1400 may include any non-transitory computer readable medium or machine readable medium, such as an optical, magnetic or semiconductor storage. Storage medium 1400 may store various types of computer executable instructions, such as instructions to implement logic flow 1300. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 15:
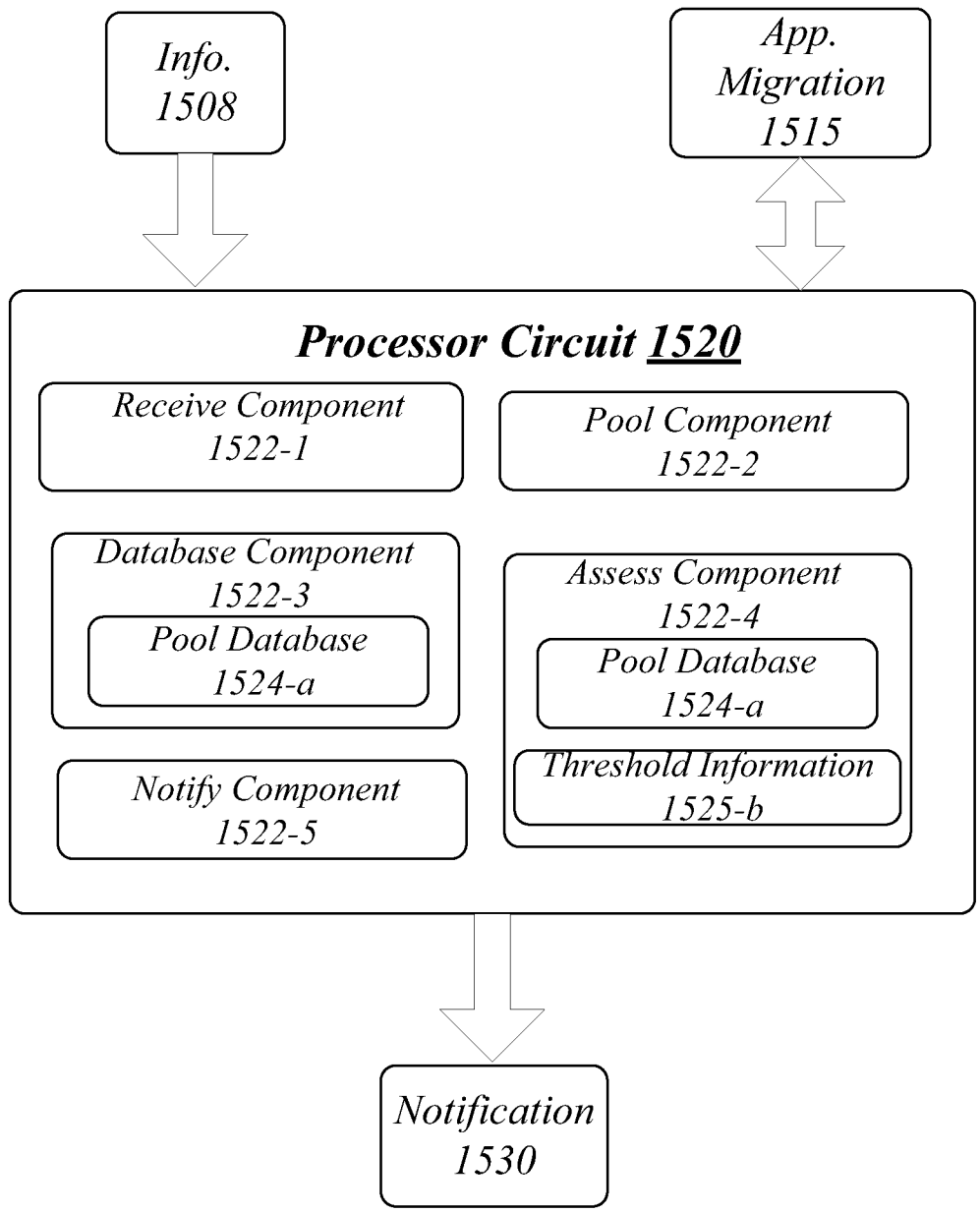
FIG. 15 illustrates an example block diagram for a third apparatus.

FIG. 15 illustrates a block diagram for an example third apparatus. As shown in FIG. 15, the example third apparatus includes apparatus 1500. Although apparatus 1500 shown in FIG. 15 has a limited number of elements in a certain topology, it may be appreciated that the apparatus 1500 may include more or less elements in alternate topologies as desired for a given implementation.

The apparatus 1500 may be supported by processor circuit 1520 maintained at a node or server (e.g., included in a data center). Processor circuit 1520 arranged to execute one or more software components 1522-*a*. It is worthy to note that "a" and "b" and "c" and similar designators as used herein are intended to be variables representing any positive integer. Thus, for example, if an implementation sets a value for a=6, then a complete set of software components 1522-*a* may include components 1522-1, 1522-2, 1522-3, 1522-4, 1522-5 or 1522-6. The examples are not limited in this context.

In some examples, as shown in FIG. 15, apparatus 1500 includes processor circuit 1520. Processor circuit 1520 may be generally arranged to execute one or more software components 1522-*a*. The processing circuit 1520 can be any of various commercially available processors to include but not limited to the processors mentioned above for apparatus 900. Also, according to some examples, processor circuit 1520 may also be an ASIC and at least some components 1522-*a* may be implemented as hardware elements of the ASIC.

According to some examples, apparatus 1500 may be located at or with a computing platform arranged to support management and/or control of servers included in at least a portion of a data center such as data center 105.

In some examples, apparatus 1500 may include a receive component 1522-1. Receive component may be executed by processor circuit 1520 to receive information to indicate output-packet-similarity for one or more applications separately executed by a PVM hosted by a first server and a SVM hosted by a second server. For these examples, the output-packet-similarity may include separate time intervals during which content matched for output packets separately generated by the one or more applications separately executed by the PVM and the SVM. The information may be included in information 1508. Information 1508 may be received from a CCA or may be received from a data structure via which the PVM and the SVM may have placed application-specific output-packet-similarity information.

According to some examples, apparatus 1500 may also include a pool component 1522-2. Pool component 1522-2 may be executed by processor circuit 1520 to add the PVM and the SVM to one of an instant pool or a buffered pool based on a CP/D mode used by a COLO manager at the first server and the second server to route output packets from the PVM or the SVM to an external network. For these examples, the instant pool may include one or more first PVMs/SVMs arranged to have outputted packets from the one or more first PVMs/SVMs immediately routed to the external network as long as content for outputted packets match between the first PVMs/SVMs. The buffered pool may include one or more second PVMs/SVMs arranged to have outputted packets from one or more second PVMs/SVMs delayed from being routed to the external network. The outputted packets may be delayed until periodic checkpoint actions are completed by respective second PVMs/SVMs In some examples, apparatus 1500 may also include a database component 1522-3 Database component may be executed by processor circuit to maintain a pool database including information to indicate the output-packet-similarity for each of the one or more applications separately executed by the PVM and the SVM. For these examples, database component 1522-3 may maintain the pool data base in pool database 1524-*a*, e.g., in a data structure such as an LUT.

According to some examples, apparatus 1500 may also include an assess component 1522-4. Assess component 1522-4 may be executed by processor circuit 1520 to use the information in pool database 1524-*a* to determine whether to migrate a first application executed by the PVM and the SVM to another PVM and SVM to cause the PVM and the SVM to have an output-packet-similarity for outputted packets generated by one or more remaining applications separately executed by the PVM and the SVM that includes an average time interval above an interval threshold. For these examples, the interval threshold may be maintained with threshold information 1525-*b* (e.g., in a LUT). In some examples, assess component 1522-4 may cause the first application to be migrated to the other PVM and SVM if the average time interval is above the interval threshold. The migration may be coordinated with a load balancer or application migrator via information included in application (App.) migration 1515.

In some examples, pool component 1522-2 may remove the PVM and the SVM from the buffered pool following the migration of the first application and add the PVM and the SVM to the instant pool. Database component 1522-3 may then update pool database 1524-*a* to reflect this change in pools for the PVM and SVM.

According to some examples, apparatus 1500 may also include a notify component 1522-2. Notify component 1522-2 may be executed by processor circuitry 1520 to send a notification to a CCA to modify a CP/D policy to cause the separate COLO managers to change the CP/D mode used to route output packets from the PVM or the SVM. For these examples, the notification may be included in notification 1530.

Various components of apparatus 1500 and a device implementing apparatus 1500 may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Example connections include parallel interfaces, serial interfaces, and bus interfaces.

FIG. 16 illustrates an example of a third logic flow. As shown in FIG. 16 the third logic flow includes a logic flow 1600. Logic flow 1600 may be representative of some or all of the operations executed by one or more logic, features, or devices described herein, such as apparatus 900. More particularly, logic flow 1600 may be implemented by at least receive component 1522-1 or a pool component 1522-2.

According to some examples, logic flow 1600 at block 1602 may receive, at a processor circuit, information to indicate output-packet-similarity for one or more applications separately executed by a PVM hosted by a first server and a SVM hosted by a second server, the output-packet-similarity including separate time intervals during which content matched for output packets separately generated by the one or more applications separately executed by the PVM and the SVM. For these examples, receive component 1522-1 may receive the information.

In some examples, logic flow 1600 at block 1604 may add the PVM and the SVM to one of an instant pool or a buffered pool based on a CP/D mode used by a COLO manager at the first server or the second server to route output packets from the PVM or the SVM to an external network, the instant pool including one or more first PVMs/SVMs arranged to have outputted packets from the one or more first PVMs/SVMs immediately routed to the external network as long as content for outputted packets match between the first PVMs/SVMs, the buffered pool including one or more second PVMs/SVMs arranged to have outputted packets from one or more second PVMs/SVMs delayed from being routed to the external network, the outputted packets delayed until periodic checkpoint actions are completed by respective second PVMs/SVMs.

FIG. 17 illustrates an example of a second storage medium. As shown in FIG. 17, the first storage medium includes a storage medium 1700. The storage medium 1700 may comprise an article of manufacture. In some examples, storage medium 1700 may include any non-transitory computer readable medium or machine readable medium, such as an optical, magnetic or semiconductor storage. Storage medium 1700 may store various types of computer executable instructions, such as instructions to implement logic flow 1600. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 18:
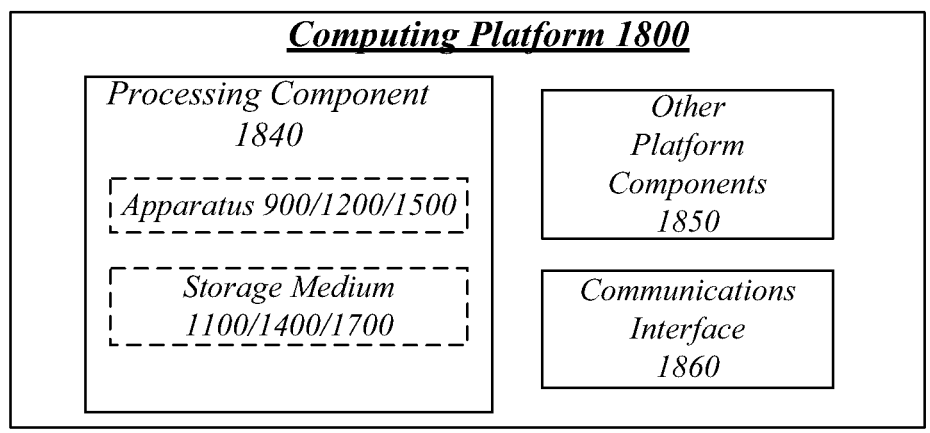
FIG. 18 illustrates an example computing platform.

FIG. 18 illustrates an example computing platform 1800. In some examples, as shown in FIG. 18, computing platform 1800 may include a processing component 1840, other platform components 1850 or a communications interface 1860. According to some examples, computing platform 1800 may be implemented in node or server computing device capable of coupling to an exterior network through an exterior network interface that may include a multitude of TCP connections.

According to some examples, processing component 1840 may execute processing operations or logic for apparatus 900/1200/1500 and/or storage medium 1100/1400/1700. Processing component 1840 may include various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, device drivers, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given example.

In some examples, other platform components 1850 may include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory), solid state drives (SSD) and any other type of storage media suitable for storing information.

In some examples, communications interface 1860 may include logic and/or features to support a communication interface. For these examples, communications interface 1860 may include one or more communication interfaces that operate according to various communication protocols or standards to communicate over direct or network communication links. Direct communications may occur via use of communication protocols or standards described in one or more industry standards (including progenies and variants) such as those associated with the PCIe specification. Network communications may occur via use of communication protocols or standards such those described in one or more Ethernet standards promulgated by IEEE. For example, one such Ethernet standard may include IEEE 802.3. Network communication may also occur according to one or more OpenFlow specifications such as the OpenFlow Hardware Abstraction API Specification.

As mentioned above computing platform 1800 may be implemented in a server or client computing device. Accordingly, functions and/or specific configurations of computing platform 1800 described herein, may be included or omitted in various embodiments of computing platform 1800, as suitably desired for a server or client computing device.

The components and features of computing platform 1800 may be implemented using any combination of discrete circuitry, application specific integrated circuits (ASICs), logic gates and/or single chip architectures. Further, the features of computing platform 1800 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary computing platform 1800 shown in the block diagram of FIG. 18 may represent one functionally descriptive example of many potential implementations. Accordingly, division, omission or inclusion of block functions depicted in the accompanying figures does not infer that the hardware components, circuits, software and/or elements for implementing these functions would necessarily be divided, omitted, or included in embodiments.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores"

may be stored on a tangible, machine readable medium and supplied to various customers or manufacturing facilities to load into the fabrication machines that actually make the logic or processor.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some examples may include an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The follow examples pertain to additional examples of technologies disclosed herein.

Example 1

An example apparatus may include a processor circuit. The example apparatus may also include a receive component for execution by the processor circuit to receive information indicating output-packet-similarity between a PVM hosted by a first server and an SVM hosted by a second server. The output-packet-similarity may include separate time intervals during which content matched for output packets from the PVM and the SVM. The example apparatus may also include a policy component for execution by the processor circuit to determine a CP/D policy for outputted packets based on the information. The example apparatus may also include a send component for execution by the processor circuit to send the CP/D policy to a COLO manager for the COLO manager to select a CP/D mode based, at least in part, on the CP/D policy.

Example 2

The apparatus of example 1, the CP/D policy may indicate whether the COLO manager is to select one of an instant mode or a buffered mode.

Example 3

The apparatus of example 2, the instant mode may include the outputted packets to be immediately routed an external network as long as content for the outputted packets matches between the PVM and the SVM, if no match, a checkpoint action is implemented and delivery of subsequent outputted packets are delayed until the checkpoint action is complete.

Example 4

The apparatus of example 2, the buffered mode may include the outputted packets to be buffered and delayed from being routed to an external network, the outputted packets delayed until a periodic checkpoint action is completed.

Example 5

The apparatus of example 4, the periodic checkpoint action may be based on a fixed time interval between implementation of the periodic check point action and a previous periodic check point action.

Example 6

The apparatus of example 2, the separate time intervals may include the separate time intervals each associated with at least one checkpoint action of a plurality of checkpoint actions by the PVM and the SVM. For these examples, longer separate time intervals may indicate a higher level of output-packet-similarity relative to shorter time intervals that may indicate a lower level of output-packet-similarity.

Example 7

The apparatus of example 6, the separate time intervals may indicate the higher level of output-packet-similarity for a majority of the plurality of checkpoint actions. For these examples, the CP/D policy may indicate to the COLO manager to select instant mode based on the separate time intervals indicating the higher level of output-packet-similarity for the majority of the separate checkpoint actions.

Example 8

The apparatus of example 6, the separate time intervals indicating the higher level of output-packet-similarity for a threshold number of the plurality of checkpoint actions. For these examples, the threshold number may be determined according to an administrative preference for a given workload for the PVM or the SVM, the COLO manager to select instant mode based on the separate time intervals indicating the higher level of output-packet-similarity for the threshold number of separate checkpoint actions.

Example 9

The apparatus of example 6, longer separate time intervals may include time intervals of greater than 40 ms. Shorter separate time intervals may include time intervals of 40 ms or less.

Example 10

The apparatus of example 2, the CP/D policy may indicate to the COLO manager to select the instant mode based on an average time interval between a number of consecutive checkpoint actions for outputted packets is greater than an interval threshold, otherwise the COLO manager is to select the periodic CP/D policy.

Example 11

The apparatus of example 2, the CP/D policy may indicate to the COLO manager to select the instant mode as long as at least one time interval between a number of consecutive checkpoint actions for outputted packets is greater than an interval threshold, otherwise the COLO manager is to select the periodic CP/D mode.

Example 12

The apparatus of example 11 may also include the receive component to receive updated information indicating updated output-packet similarity between the PVM and the SVM. The policy component may determine whether to update the CP/D policy based on the updated information. The send component may send an updated CP/D policy to the COLO manager based on an updated CP/D policy by the policy component. The updated CP/D may cause the COLO manager to change from instant to buffered mode.

Example 13

The apparatus of example 12 may also include a database component for execution by the processor circuit to maintain the information and the updated information in a database that also includes historical statistical information for output-packet-similarity between the PVM and the SVM. The policy component may determine whether to update the CP/D policy based on both the updated information and the historical statistical information.

Example 14

The apparatus of example 1 may also include a digital display coupled to the circuitry to present a user interface view.

Example 15

An example method may include receiving, at a processor circuit, information indicating output-packet-similarity between a PVM hosted by a first server and an SVM hosted by a second server. The output-packet-similarity including separate time intervals during which content matched for output packets from the PVM and the SVM. The method may also include determining a CP/D policy for outputted packets based on the information. The method may also include sending the CP/D policy to a COLO manager for the COLO manager to select a CP/D mode based, at least in part, on the CP/D policy.

Example 16

The method of example 15, the CP/D policy may indicate whether the COLO manager is to select one of an instant mode or a buffered mode.

Example 17

The method of example 15, the instant mode may include the outputted packets to be immediately routed to an external network as long as content for the outputted packets matches between the PVM and the SVM, if no match, a checkpoint action is implemented and delivery of subsequent outputted packets are delayed until the checkpoint action is complete.

Example 18

The method of example 16, the buffered mode may include the outputted packets to be buffered and delayed from being routed to an external network, the outputted packets delayed until a periodic checkpoint action is completed.

Example 19

The method of example 18, the periodic checkpoint action may be based on a fixed time interval between implementation of the periodic check point action and a previous periodic check point action.

Example 20

The method of example 16, the separate time intervals may each be associated with at least one checkpoint action of a plurality of checkpoint actions by the PVM and the SVM. For these examples, longer separate time intervals may indicate a higher level of output-packet-similarity relative to shorter time intervals that may indicate a lower level of output-packet-similarity.

Example 21

The method of example 20, the separate time intervals indicating the higher level of output-packet-similarity for a majority of the plurality of checkpoint actions. For these examples, the CP/D policy may indicate to the COLO manager to select instant mode based on the separate time intervals indicating the higher level of output-packet-similarity for the majority of the separate checkpoint actions.

Example 22

The method of example 20, the separate time intervals may indicate the higher level of output-packet-similarity for a threshold number of the plurality of checkpoint actions. For these examples, the threshold number may be determined according to an administrative preference for a given workload for the PVM or the SVM, the COLO manager to select instant mode based on the separate time intervals indicating the higher level of output-packet-similarity for the threshold number of separate checkpoint actions.

Example 23

The method of example 20, longer separate time intervals may include time intervals of greater than 40 ms, shorter separate time intervals may include time intervals of 40 ms or less.

Example 24

The method of example 16, the CP/D policy may indicate to the COLO manager to select the instant mode based on an average time interval between a number of consecutive checkpoint actions for outputted packets is greater than an interval threshold, otherwise the COLO manager is to select the periodic CP/D policy.

Example 25

The method of example 16, the CP/D policy may indicate to the COLO manager to select the instant mode as long as at least one time interval between a number of consecutive checkpoint actions for outputted packets is greater than an interval threshold, otherwise the COLO manager is to select the periodic CP/D mode.

Example 26

The method of example 16 may also include receiving updated information indicating updated output-packet similarity between the PVM and the SVM. The method may also include determining whether to update the CP/D policy based on the updated information. The method may also include sending an updated CP/D policy to the COLO manager based on an updated CP/D policy that causes the COLO manager to change from instant to buffered mode.

Example 27

The method of example 26 may also include maintaining the information and the updated information in a database also including historical statistical information for output-packet-similarity between the PVM and the SVM. The method may also include determining whether to update the CP/D policy based on both the updated information and the historical statistical information.

Example 28

An example at least one machine readable medium may include a plurality of instructions that in response to being executed by system at a computing platform cause the system to carry out a method according to any one of examples 15 to 28.

Example 29

An example apparatus comprising means for performing the methods of any one of examples 15 to 28.

Example 30

An example at least one machine readable medium may include a plurality of instructions that in response to being executed by a system implemented on a computing platform cause the system to receive information indicating output-packet-similarity between a PVM hosted by a first server and an SVM hosted by a second server. The output-packet-similarity may include separate time intervals during which content matched for output packets from the PVM and the SVM. The instructions may also cause the system to determine a CP/D policy for outputted packets generated by the one or more applications based on the information. The instructions may also cause the system to send the CP/D policy to a COLO manager for the COLO manager to select a CP/D mode based, at least in part, on the CP/D policy.

Example 31

The at least one machine readable medium of example 30, the CP/D policy may indicate whether the COLO manager is to select one of an instant mode or a buffered mode.

Example 32

The at least one machine readable medium of example 31, the instant mode may include the outputted packets to be immediately routed to an external network as long as content for the outputted packets matches between the PVM and the SVM, if no match, a checkpoint action is implemented and delivery of subsequent outputted packets are delayed until the checkpoint action is complete.

Example 33

The at least one machine readable medium of example 31, the buffered mode may include the outputted packets to be buffered and delayed from being routed to an external network, the outputted packets delayed until a periodic checkpoint action is completed.

Example 34

The at least one machine readable medium of example 33, the periodic checkpoint action may be based on a fixed time interval between implementation of the periodic check point action and a previous periodic check point action.

Example 35

The at least one machine readable medium of example 31, the separate time intervals may include separate time intervals associated with separate checkpoint actions by the PVM and the SVM. For these examples, longer time interval may indicate a higher level of output-packet-similarity relative to shorter time intervals that may indicate a lower level of output-packet-similarity.

Example 36

The at least one machine readable medium of example 35, the separate time intervals indicating the higher level of output-packet-similarity for a majority of the plurality of checkpoint actions. For these examples, the CP/D policy to indicate to the COLO manager to select instant mode based on the separate time intervals indicating the higher level of output-packet-similarity for the majority of the separate checkpoint actions.

Example 37

The at least one machine readable medium of example 35, the separate time intervals indicating the higher level of output-packet-similarity for a threshold number of the plurality of checkpoint actions. For these examples, the threshold number determined according to an administrative preference for a given workload for the PVM or the SVM. The COLO manager may select instant mode based on the separate time intervals indicating the higher level of output-packet-similarity for the threshold number of separate checkpoint actions.

Example 38

The at least one machine readable medium of example 35, longer separate time intervals may include time intervals of greater than 40 ms. Shorter time intervals may include time intervals of 40 ms or less.

Example 39

The at least one machine readable medium of example 31, the CP/D policy may indicate to the COLO manager to select the instant mode based on an average time interval between a number of consecutive checkpoint actions for outputted packets is greater than an interval threshold, otherwise the COLO manager is to select the periodic CP/D policy.

Example 40

The at least one machine readable medium of example 31, the CP/D policy may indicate to the COLO manager to select the instant mode as long as at least one time interval between a number of consecutive checkpoint actions for outputted packets is greater than an interval threshold, otherwise the COLO manager is to select the periodic CP/D mode.

Example 41

The at least one machine readable medium of example 31, the instructions may further cause the system to receive updated information indicating updated output-packet similarity between the PVM and the SVM. The instructions to also cause the system to determine whether to update the CP/D policy based on the updated information. The instructions to also cause the system to send an updated CP/D policy to the COLO manager based on an updated CP/D policy that causes the COLO manager to change from instant to buffered mode.

Example 42

The at least one machine readable medium of example 31, the instructions may further cause the system to maintain the information and the updated information in a database also including historical statistical information for output-packet-similarity between the PVM and the SVM. The instructions may also cause the system to determine whether to update the CP/D policy based on both the updated information and the historical statistical information.

Example 43

An example apparatus may include a processor circuit. The apparatus may also include a compare component for execution by the processor circuit to compare output packet contents from a primary virtual machine (PVM) hosted by a first server with output packet contents from a secondary virtual machine (SVM) hosted by a second server. The apparatus may also include an interval component for execution by the processor circuit to determine one or more time intervals via which the output packet contents match. The apparatus may also include a similarity component for execution by the processor circuit to update information indicating output-packet-similarity between the PVM and the SVM based on the one or more time intervals. The apparatus may also include a send component for execution by the processor circuit to send the updated information to a CCA for the CCA to determine a CP/D policy for outputted packets from the PVM and the SVM.

Example 44

The apparatus of example 43 may also include a receive component for execution by the processor circuit to receive the determined CP/D policy from the CCA. The apparatus may also include a select component for execution by the processor circuit to select a CP/D mode based, at least in part, on the CP/D policy.

Example 45

The apparatus of example 44, the CP/D mode may be one of an instant mode or a buffered mode.

Example 46

The apparatus of example 45, the instant mode may include the outputted packets to be immediately routed to an external network as long as content for the outputted packets matches between the application executed at the PVM and executed at the SVM, if no match, a checkpoint action is implemented and delivery of subsequent outputted packets are delayed until the checkpoint action is complete.

Example 47

The apparatus of example 46, the buffered mode may include the outputted packets to be buffered and delayed from being routed to an external network. For these examples, the outputted packets may be delayed until a periodic checkpoint action is completed.

Example 48

The apparatus of example 45, the periodic checkpoint action may be based on a fixed time interval between implementation of the periodic check point action and a previous periodic check point action.

Example 49

The apparatus of example 45, the one or more time intervals may include one or more separate time intervals associated with at least one checkpoint action of a plurality of checkpoint actions by the PVM and the SVM. For these examples, longer time intervals may indicate a higher level of output-packet-similarity relative to shorter time intervals that may indicate a lower level of output-packet-similarity.

Example 50

The apparatus of example 49, the one or more time intervals indicating the higher level of output-packet-similarity for a majority of the plurality of checkpoint actions. For these examples, the CP/D policy may be received from the CCA to indicate selection of instant mode based on the higher level of output-packet-similarity.

Example 51

The apparatus of example 49, longer time intervals may include time intervals of greater than 40 ms. Shorter time intervals may include time intervals of 40 ms or less.

Example 52

The apparatus of example 43 may also include a digital display coupled to the processor circuit to present a user interface view.

Example 53

An example method may include comparing, at a processor circuit, output packet contents from a primary virtual machine (PVM) hosted by a first server with output packet contents from a secondary virtual machine (SVM) hosted by a second server. The method may also include determining one or more time intervals via which the output packet contents match. The method may also include updating information indicating output-packet-similarity between the PVM and the SVM based on the one or more time intervals. The method may also include sending the updated information to a CCA for the CCA to determine a CP/D policy for outputted packets from the PVM and the SVM.

Example 54

The method of example 53 may also include receiving the determined CP/D policy from the CCA. The method may also include selecting a CP/D mode based, at least in part, on the CP/D policy.

Example 55

The method of example 54, the CP/D mode may be one of an instant mode or a buffered mode.

Example 56

The method of example 55, the instant mode may include the outputted packets to be immediately routed to an external network as long as content for the outputted packets matches between the application executed at the PVM and executed at the SVM, if no match, a checkpoint action is implemented and delivery of subsequent outputted packets are delayed until the checkpoint action is complete.

Example 57

The method of example 55, the buffered mode may include the outputted packets to be buffered and delayed from being routed to an external network. For these examples, the outputted packets may be delayed until a periodic checkpoint action is completed.

Example 58

The method of example 55, the periodic checkpoint action may be based on a fixed time interval between implementation of the periodic check point action and a previous periodic check point action.

Example 59

The method of example 55, the one or more time intervals may include one or more separate time intervals associated with at least one checkpoint action of a plurality of checkpoint actions by the PVM and the SVM. For these examples, longer time intervals may indicate a higher level of output-packet-similarity relative to shorter time intervals that may indicate a lower level of output-packet-similarity.

Example 60

The method of example 59, the one or more time intervals may indicate the higher level of output-packet-similarity for a majority of the plurality of checkpoint actions. For these examples, the CP/D policy may be received from the CCA to indicate selection of instant mode based on the higher level of output-packet-similarity.

Example 61

The method of example 59, longer time interval including time intervals of greater than 40 ms, shorter time intervals including time intervals of 40 ms or less.

Example 62

An example at least one machine readable medium may include a plurality of instructions that in response to being executed by system at a computing platform may cause the system to carry out a method according to any one of examples 53 to 62.

Example 63

An example apparatus may include means for performing the methods of any one of examples 53 to 62.

Example 64

An example at least one machine readable medium may include a plurality of instructions that in response to being executed by system implemented on a computing platform may cause the system to compare output packet contents from a primary virtual machine (PVM) hosted by a first server with output packet contents from a secondary virtual machine (SVM) hosted by a second server. The output packets may be routed to a same transport control protocol (TCP) connection. The instructions may also cause the system to determine one or more time durations via which the output packet contents match. The instructions may also cause the system to update information indicating output-packet-similarity between the PVM and the SVM based on the one or more time intervals. The instructions may also cause the system to send the updated information to an arbitrator for the arbitrator to determine a CP/D policy for outputted packets from the PVM and the SVM.

Example 65

The at least one machine readable medium of example 64, the arbitrator may include a CCA.

Example 66

The at least one machine readable medium of example 64, the instructions may further cause the system to receive the determined CP/D policy from the arbitrator. The instructions may also cause the system to select a CP/D mode based, at least in part, on the CP/D policy.

Example 67

The at least one machine readable medium of example 65, the CP/D mode may be one of an instant mode or a buffered mode.

Example 68

The at least one machine readable medium of example 67, the instant mode may include the outputted packets to be immediately routed to an external network as long as content for the outputted packets matches between the application executed at the PVM and executed at the SVM, if no match, a checkpoint action is implemented and delivery of subsequent outputted packets are delayed until the checkpoint action is complete.

Example 69

The at least one machine readable medium of example 68, the buffered mode may include the outputted packets to be buffered and delayed from being routed to an external network. For these examples, the outputted packets may be delayed until a periodic checkpoint action is completed.

Example 70

The at least one machine readable medium of example 67, the periodic checkpoint action based on a fixed time interval between implementation of the periodic check point action and a previous periodic check point action.

Example 71

The at least one machine readable medium of example 67, the one or more time intervals may include one or more separate time intervals associated with at least one checkpoint action of a plurality of checkpoint actions by the PVM and the SVM. For these examples, longer time intervals may indicate a higher level of output-packet-similarity relative to shorter time intervals that may indicate a lower level of output-packet-similarity.

Example 72

The at least one machine readable medium of example 71, the one or more time intervals indicating the higher level of output-packet-similarity for a majority of the plurality of checkpoint actions. For these examples, the CP/D policy may be received from the CCA to indicate selection of instant mode based on the higher level of output-packet-similarity.

Example 73

The at least one machine readable medium of example 71, longer time intervals may include time intervals of greater than 40 ms. Shorter time intervals may include time intervals of 40 ms or less.

Example 74

An example apparatus may include a processor circuit. The apparatus may also include a receive component for execution by the processor circuit to receive information to indicate output-packet-similarity for one or more applications separately executed by a PVM hosted by a first server and an SVM hosted by a second server. The output-packet-similarity may include separate time intervals during which content matched for output packets separately generated by the one or more applications separately executed by the PVM and the SVM. The apparatus may also include a pool component for execution by the processor circuit to add the PVM and the SVM to one of an instant pool or a buffered pool based on a CP/D mode used by a COLO manager at the first server or the second server to route output packets from the PVM or the SVM to an external network. The instant pool may include one or more first PVMs/SVMs arranged to have outputted packets from the one or more first PVMs/SVMs immediately routed to the external network as long as content for outputted packets match between the first PVMs/SVMs. The buffered pool may include one or more second PVMs/SVMs arranged to have outputted packets from one or more second PVMs/SVMs delayed from being routed to the external network, the outputted packets delayed until periodic checkpoint actions are completed by respective second PVMs/SVMs.

Example 75

The apparatus of example 74 may also include the pool component to add the PVM and the SVM to the buffered pool and a database component for execution by the processor circuit to maintain a pool database including information to indicate the output-packet-similarity for each of the one or more applications separately executed by the PVM and the SVM. The apparatus may also include a migrate component for execution by the processor circuit to use the information in the pool database to determine whether to migrate a first application executed by the PVM and the SVM to another PVM and SVM to cause the PVM and the SVM to have an output-packet-similarity for outputted packets generated by one or more remaining applications separately executed by the PVM and the SVM that includes an average time interval above an interval threshold. The migrate component may cause the first application to be migrated to the other PVM/SVM if the average time interval is above the interval threshold. The pool component may remove the PVM and the SVM from the buffered pool following the migration of the first application and add the PVM and the SVM to the instant pool. The apparatus may also include a notify component for execution by the processor circuit to send a notification to a CCA to modify a CP/D policy to cause the COLO manager to change the CP/D mode used to route output packets from the PVM or the SVM to the external network.

Example 76

The apparatus of example 75, the CP/D mode changed from a buffered mode to an instant mode.

Example 77

The apparatus of example 75, the interval threshold may be 40 milliseconds.

Example 78

An example method may include receiving, at a processor circuit, information to indicate output-packet-similarity for one or more applications separately executed by a PVM hosted by a first server and an SVM hosted by a second server. The output-packet-similarity may include separate time intervals during which content matched for output packets separately generated by the one or more applications separately executed by the PVM and the SVM. The method may also include adding the PVM and the SVM to one of an instant pool or a buffered pool based on a CP/D mode used by a COLO manager at the first server or the second server to route output packets from the PVM or the SVM to an external network. The instant pool may include one or more first PVMs/SVMs arranged to have outputted packets from the one or more first PVMs/SVMs immediately routed to the external network as long as content for outputted packets match between the first PVMs/SVMs. The buffered pool may include one or more second PVMs/SVMs arranged to have outputted packets from one or more second PVMs/SVMs delayed from being routed to the external network. The outputted packets may be delayed until periodic checkpoint actions are completed by respective second PVMs/SVMs.

Example 79

The method of example 78 may also include adding the PVM and the SVM to the buffered pool. The method may also include maintaining a pool database including information to indicate the output-packet-similarity for each of the one or more applications separately executed by the PVM and the SVM. The method may also include assessing, based on the information in the pool database, whether to migrate a first application executed by the PVM and the SVM to another PVM and SVM to cause the PVM and the SVM to have an output-packet-similarity for outputted packets generated by one or more remaining applications separately executed by the PVM and the SVM that includes an average time interval above an interval threshold. The method may also include causing the first application to be migrated to the other PVM and SVM if the average time interval is above the interval threshold. The method may also include removing the PVM and the SVM from the buffered pool following the migration of the first application and add the PVM and the SVM to the instant pool. The method may also include notifying a CCA to modify a CP/D policy to cause the separate COLO managers to change the CP/D mode used to route output packets from the PVM or the SVM to the external network.

Example 80

The method of example 79, the CP/D mode changed from a buffered mode to an instant mode.

Example 81

The method of example 75, the interval threshold comprising 40 milliseconds.

Example 82

An example at least one machine readable medium may include a plurality of instructions that in response to being executed by system at a computing platform may cause the system to carry out a method according to any one of examples 78 to 81.

Example 83

An example apparatus may include means for performing the methods of any one of examples 78 to 81.

Example 84

An example at least one machine readable medium may include a plurality of instructions that in response to being executed by system implemented on a computing platform may cause the system to receive information to indicate output-packet-similarity for one or more applications separately executed by a PVM hosted by a first server and an SVM hosted by a second server. The output-packet-similarity may include separate time intervals during which content matched for output packets separately generated by the one or more applications separately executed by the PVM and the SVM. The instructions may also cause the system to add the PVM and the SVM to one of an instant pool or a buffered pool based on a CP/D mode used by a COLO manager at the first server and the second server to route output packets from the PVM or the SVM to an external network. The instant pool may include one or more first PVMs/SVMs arranged to have outputted packets from the one or more first PVMs/SVMs immediately routed to the external network as long as content for outputted packets match between the first PVMs/SVMs. The buffered pool may include one or more second PVMs/SVMs arranged to have outputted packets from one or more second PVMs/SVMs delayed from being routed to the external network. The outputted packets may be delayed until periodic checkpoint actions are completed by respective second PVMs/SVMs.

Example 85

The at least one machine readable medium of example 84, may include the instructions to further cause the system to add the PVM and the SVM to the buffered pool. The instructions may also cause the system to maintain a pool database including information to indicate the output-packet-similarity for each of the one or more applications separately executed by the PVM and the SVM. The instructions may also cause the system to assess, based on the information in the pool database, whether to migrate a first application executed by the PVM and the SVM to another PVM and SVM to cause the PVM and the SVM to have an output-packet-similarity for outputted packets generated by one or more remaining applications separately executed by the PVM and the SVM that includes an average time interval above an interval threshold. The instructions may also cause the system to cause the first application to be migrated to the other PVM and SVM if the average time interval is above the interval threshold. The instructions may also cause the system to remove the PVM and the SVM from the buffered pool following the migration of the first application and add the PVM and the SVM to the instant pool. The instructions may also cause the system to notify a CCA to modify a CP/D policy to cause the separate COLO managers to change the CP/D mode used to route output packets from the PVM or the SVM to the external network.

Example 86

The at least one machine readable medium of example 85, the CP/D mode changed from a buffered mode to an instant mode.

Example 87

The at least one machine readable medium of example 85, the interval threshold may be 40 milliseconds.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus comprising:
a processor circuit; and
a memory storing instructions which when executed by the processor circuit cause the processor circuit to:
receive information indicating output-packet-similarity between a primary virtual machine (PVM) hosted by a first server and a secondary virtual machine (SVM) hosted by a second server, the output-packet-similarity including separate time intervals during which content matched for output packets from the PVM and the SVM;
determine a checkpointing/delivery policy for outputted packets based on the information; and
send the checkpointing/delivery policy to a coarse-grained lock-stepping (COLO) manager for the COLO manager to select a checkpointing/delivery mode based, at least in part, on the checkpointing/delivery policy, the checkpointing/delivery mode comprising a periodic checkpointing/buffered delivery mode and an on-demand checkpointing/instant delivery mode, the periodic checkpointing/buffered delivery mode the outputted packets not being immediately routed to an external network and being buffered and delayed from being routed to the external network until a periodic checkpoint action is completed, the periodic checkpoint action based on a fixed time interval between implementation of the periodic checkpoint action and a previous periodic checkpoint action, the COLO manager to select the on-demand checkpointing/instant delivery mode based on a determination that at least one time interval between a plurality of consecutive periodic checkpoint actions is greater than an interval threshold, the on-demand checkpointing/instant delivery mode the outputted packets to be immediately routed to the external network as long as content for the outputted packets matches between the PVM and the SVM, if no match, a checkpoint action is implemented and delivery of subsequent outputted packets are delayed until the checkpoint action is complete.

2. The apparatus of claim 1, the separate time intervals comprising the separate time intervals each associated with at least one checkpoint action of a plurality of checkpoint actions by the PVM and the SVM, longer separate time intervals indicating a higher level of output-packet-similarity relative to shorter time intervals indicating a lower level of output-packet-similarity.

3. The apparatus of claim 2, the separate time intervals indicating the higher level of output-packet-similarity for a majority of the plurality of checkpoint actions, the checkpointing/delivery policy to indicate to the COLO manager to select the on-demand checkpointing/instant delivery mode based on the separate time intervals indicating the higher level of output-packet-similarity for the majority of the plurality of checkpoint actions.

4. The apparatus of claim 2, the separate time intervals indicating the higher level of output-packet-similarity for a threshold number of the plurality of checkpoint actions, the threshold number determined according to an administrative preference for a given workload for the PVM or the SVM, the COLO manager to the select on-demand checkpointing/instant delivery mode based on the separate time intervals indicating the higher level of output-packet-similarity for the threshold number of the plurality of checkpoint actions.

5. The apparatus of claim 2, longer separate time intervals including time intervals of greater than 40 milliseconds (ms), shorter separate time intervals including time intervals of 40 ms or less.

6. The apparatus of claim 1, the checkpointing/delivery policy to indicate to the COLO manager to select the on-demand checkpointing/instant delivery mode based on an average of each time interval between the plurality of consecutive periodic checkpoint actions for outputted packets is greater than a second interval threshold, otherwise the COLO manager is to select the periodic checkpointing/buffered delivery mode.

7. The apparatus of claim 1, the COLO manager to select the periodic checkpointing/buffered delivery mode based on a determination that each time interval between the plurality of consecutive periodic checkpoint actions is less than the interval threshold.

8. The apparatus of claim 7, the memory storing instructions which when executed by the processor circuit cause the processor circuit to:
receive updated information indicating updated output-packet similarity between the PVM and the SVM;
determine whether to update the checkpointing/delivery policy based on the updated information; and
send an updated checkpointing/delivery policy to the COLO manager based on an updated checkpointing/delivery policy, the updated checkpointing/delivery policy to cause the COLO manager to change from the on-demand checkpointing/instant delivery mode to the periodic checkpointing/buffered delivery mode.

9. The apparatus of claim 8, the memory storing instructions which when executed by the processor circuit cause the processor circuit to:
maintain the information and the updated information in a database that also includes historical statistical information for output-packet-similarity between the PVM and the SVM; and
determine whether to update the checkpointing/delivery policy based on both the updated information and the historical statistical information.

10. The apparatus of claim 1, comprising a digital display coupled to the processor circuit to present a user interface view.

11. The apparatus of claim 1, the memory storing instructions which when executed by the processor circuit cause the processor circuit to:
add the PVM and the SVM to one of an instant pool or a buffered pool based on the checkpointing/delivery mode.

12. The apparatus of claim 11, the memory storing instructions which when executed by the processor circuit cause the processor circuit to:
maintain a pool database operative to indicate output-packet-similarity for applications running on PVM or SVM.

13. At least one non-transitory machine readable medium comprising a plurality of instructions that in response to being executed by a system implemented on a computing platform cause the system to:
receive information indicating output-packet-similarity between a primary virtual machine (PVM) hosted by a first server and a secondary virtual machine (SVM) hosted by a second server, the output-packet-similarity including separate time intervals during which content matched for output packets from the PVM and the SVM;
determine a checkpointing/delivery policy for outputted packets based on the information; and
send the checkpointing/delivery policy to a coarse-grained lock-stepping (COLO) manager for the COLO manager to select a checkpointing/delivery mode based, at least in part, on the checkpointing/delivery policy, the checkpointing/delivery mode comprising a periodic checkpointing/buffered delivery mode and an on-demand checkpointing/instant delivery mode, the periodic checkpointing/buffered delivery mode the outputted packets not being immediately routed to an external network and being buffered and delayed from being routed to the external network until a periodic checkpoint action is completed, the periodic checkpoint action based on a fixed time interval between implementation of the periodic checkpoint action and a previous periodic checkpoint action, the COLO manager to select the on-demand checkpointing/instant delivery mode based on a determination that an average of each time interval between a plurality of consecutive periodic checkpoint actions is greater than an interval threshold, the on-demand checkpointing/instant delivery mode the outputted packets to be immediately routed to the external network as long as content for the outputted packets matches between the PVM and the SVM, if no match, a checkpoint action is implemented and delivery of subsequent outputted packets are delayed until the checkpoint action is complete.

14. The at least one machine non-transitory readable medium of claim 13, the COLO manager to select the periodic checkpointing/buffered delivery mode based on a determination that the average of each time interval between the plurality of consecutive periodic checkpoint actions is less than the interval threshold.

15. The at least one machine non-transitory readable medium of claim 13, the COLO manager to select the on-demand checkpointing/instant delivery mode based on a determination that at least one time interval between a plurality of consecutive periodic checkpoint actions for outputted packets is greater than a second interval threshold, otherwise the COLO manager is to select the periodic checkpointing/buffered delivery mode.

16. The at least one non-transitory machine readable medium of claim 13, the instructions to further cause the system to:
receive updated information indicating updated output-similarity between the PVM and the SVM;
determine whether to update the checkpointing/delivery policy based on the updated information; and
send an updated checkpointing/delivery policy to the COLO manager based on an updated checkpointing/delivery policy that causes the COLO manager to change from the on-demand checkpointing/instant delivery mode to the periodic checkpointing/buffered delivery mode.

17. A method comprising:
comparing, at a processor circuit, output packet contents from a primary virtual machine (PVM) hosted by a first server with output packet contents from a secondary virtual machine (SVM) hosted by a second server;
determining one or more time intervals via which the output packet contents match;
updating information indicating output-packet-similarity between the PVM and the SVM based on the one or more time intervals; and
sending the updated information to a coarse-grained lock-stepping (COLO) checkpointing arbitrator (CCA) for the CCA to determine a checkpointing/delivery mode policy for outputted packets from the PVM and the SVM, the checkpointing/delivery mode comprising a periodic checkpointing/buffered delivery mode and an on-demand checkpointing/instant delivery mode, the periodic checkpointing/buffered delivery mode the outputted packets not being immediately routed to an external network and being buffered and delayed from being routed to the external network until a periodic checkpoint action is completed, the periodic checkpoint action based on a fixed time interval between implementation of the periodic checkpoint action and a previous periodic checkpoint action, the CCA to select the on-demand checkpointing/instant delivery mode based on a determination that at least one time interval between a plurality of consecutive periodic checkpoint actions is greater than an interval threshold, the on-demand checkpointing/instant delivery mode the outputted packets to be immediately routed to the external network as long as content for the outputted packets matches between the PVM and the SVM, if no match, a checkpoint action is implemented and delivery of subsequent outputted packets are delayed until the checkpoint action is complete.

18. The method of claim 17, the one or more time intervals comprising one or more separate time intervals associated with at least one checkpoint action of a plurality of checkpoint actions by the PVM and the SVM, longer time intervals indicating a higher level of output-packet-similarity relative to shorter time intervals indicating a lower level of output-packet-similarity.

19. The method of claim 17, further comprising adding, via a COLO pool manager, the PVM and the SVM to one of an instant pool or a buffered pool based on the checkpointing/delivery mode.

20. At least one non-transitory machine readable medium comprising a plurality of instructions that in response to being executed by system implemented on a computing platform cause the system to:
receive information to indicate output-packet-similarity for one or more applications separately executed by a primary virtual machine (PVM) hosted by a first server and a secondary virtual machine (SVM) hosted by a second server, the output-packet-similarity including separate time intervals during which content matched for output packets separately generated by the one or more applications separately executed by the PVM and the SVM;
add, via a coarse-grained lock-stepping (COLO) pool manager, the PVM and the SVM to a buffered pool based on a checkpointing/delivery mode used by a COLO manager at the first server and the second server to route output packets from the PVM or the SVM to an external network, the buffered pool including one or more first PVMs/SVMs arranged to have outputted packets from one or more first PVMs/SVMs delayed from being routed to the external network without being immediately routed to an external network;
determine, based on the output-packet-similarity, that migration of a first application executed by the PVM and the SVM to another PVM and SVM would cause the PVM and the SVM to have an output-packet-similarity for outputted packets generated by one or more remaining applications separately executed by the PVM and the SVM that includes an average time interval above a time interval threshold;
cause the first application to be migrated to the other PVM and SVM;
remove the PVM and the SVM from the buffered pool following the migration of the first application and add the PVM and the SVM to an instant pool including one or more second PVMs/SVMs arranged to have outputted packets from the one or more second PVMs/SVMs immediately routed to the external network when content for outputted packets match between the second PVMs/SVMs; and
notify a COLO checkpointing arbitrator (CCA) to modify a checkpointing/delivery policy to cause the COLO manager to change the checkpointing/delivery mode used to route output packets from the PVM or the SVM to the external network.

21. The at least one non-transitory machine readable medium of claim 20, the instructions to further cause the system to:
maintain a pool database including the information to indicate the output-packet-similarity for each of the one or more applications separately executed by the PVM and the SVM; and
cause the first application to be migrated to the other PVM and SVM based on the determination that the migration would cause the average time interval to be above the interval threshold.

22. The at least one non-transitory machine readable medium of claim 21, comprising the checkpointing/delivery mode changed from a periodic checkpointing/buffered delivery mode to an on-demand checkpointing/instant delivery mode.

* * * * *

UNITED STATES PATENT AND TRADEMARK OFFICE
CERTIFICATE OF CORRECTION

PATENT NO.         : 10,620,979 B2
APPLICATION NO.    : 15/516381
DATED              : April 14, 2020
INVENTOR(S)        : Kun Tian and Yao Zu Dong It is certified that error appears in the above-identified patent and that said Letters Patent is hereby corrected as shown below:

In the Claims

Column 36, Line 11, Claim 1 replace "mode the outputted" with -- mode comprising the outputted --.

Column 36, Line 24, Claim 1 replace "mode the outputted" with -- mode comprising the outputted --.

Column 37 Line 62, Claim 13 replace "mode the outputted" with -- mode comprising the outputted --.

Column 38, Line 8, Claim 13 replace "mode the outputted" with -- mode comprising the outputted --.

Column 38, Line 29, Claim 16 replace "claim 13, the instructions to further" with -- claim 13, comprising the instructions to further --.

Column 38, Line 58, Claim 17 replace "mode the outputted" with -- mode comprising the outputted --.

Column 39, Line 3, Claim 17 replace "mode the outputted" with -- mode comprising the outputted --.

Column 40, Line 26, Claim 21 replace "claim 20, the instructions to further" with -- claim 13, comprising the instructions to further --.

Signed and Sealed this
Sixteenth Day of June, 2020

Andrei Iancu
*Director of the United States Patent and Trademark Office*